United States Patent
Hara

(10) Patent No.: US 8,392,671 B2
(45) Date of Patent: Mar. 5, 2013

(54) MEMORY CONTROLLER, SYSTEM, AND METHOD FOR ACCESSING SEMICONDUCTOR MEMORY

(75) Inventor: Soji Hara, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 333 days.

(21) Appl. No.: 12/787,212

(22) Filed: May 25, 2010

(65) Prior Publication Data

US 2010/0306460 A1 Dec. 2, 2010

(30) Foreign Application Priority Data

May 27, 2009 (JP) ................................. 2009-127265

(51) Int. Cl.
*G06F 12/00* (2006.01)
*G06F 3/00* (2006.01)

(52) U.S. Cl. ................ 711/154; 711/105; 711/E12.001; 710/52

(58) Field of Classification Search .................... 710/52; 711/105, E12.001, 154; 327/63
See application file for complete search history.

(56) References Cited

U.S. PATENT DOCUMENTS

| | | | |
|---|---|---|---|
| 6,188,251 B1* | 2/2001 | Priemer et al. .................. | 327/63 |
| 2004/0207435 A1* | 10/2004 | Shi et al. ......................... | 327/58 |
| 2007/0204076 A1* | 8/2007 | Arulambalam et al. ........ | 710/35 |
| 2010/0095058 A1* | 4/2010 | Proebsting .................... | 711/106 |

FOREIGN PATENT DOCUMENTS

JP 2006-172240 A 6/2006

* cited by examiner

*Primary Examiner* — Charles Rones
*Assistant Examiner* — Mehdi Namazi
(74) *Attorney, Agent, or Firm* — Arent Fox LLP

(57) ABSTRACT

A memory controller includes a sorting determination circuit which activates a sorting signal when an access request address for wrapping access to at least one memory block of a semiconductor memory is different from a first leading address of the at least one memory block, an address conversion circuit which sets the first leading address to an access starting address when the sorting signal is activated, a first data sorting circuit which sorts, when the sorting signal is activated, data sequentially read from the semiconductor memory in accordance with the access starting address starting from data corresponding to the access request address and a first output circuit which outputs the sorted data to an external bus.

20 Claims, 19 Drawing Sheets

MEMORY CONTROLLER, SYSTEM, AND METHOD FOR ACCESSING SEMICONDUCTOR MEMORY

CROSS-REFERENCE TO RELATED APPLICATIONS

This application claims the benefit of priority from Japanese Patent Application No. 2009-127265 filed on May 27, 2009, the entire contents of which are incorporated herein by reference.

BACKGROUND

1. Field

Embodiments discussed herein relate to a semiconductor memory.

2. Description of Related Art

Semiconductor memories such as SDRAMs (Synchronous Dynamic Random Access Memories) have burst transmission functions in order to improve access efficiency. In an incrementing burst transmission, a burst operation is performed by successively incrementing an access address. In a wrapping burst transmission, a burst operation is performed by generating access addresses within a given range in a circulating manner.

Related art is discussed in Japanese Laid-open Patent Publication No. 2006-172240 or the like.

SUMMARY

According to one aspect of the embodiments, a memory controller includes a sorting determination circuit which activates a sorting signal when an access request address for wrapping access to at least one memory block of a semiconductor memory is different from a first leading address of the at least one memory block, an address conversion circuit which sets the first leading address to an access starting address when the sorting signal is activated, a first data sorting circuit which sorts, when the sorting signal is activated, data sequentially read from the semiconductor memory in accordance with the access starting address starting from data corresponding to the access request address and a first output circuit which outputs the sorted data to an external bus.

Additional advantages and novel features of the invention will be set forth in part in the description that follows, and in part will become more apparent to those skilled in the art upon examination of the following or upon learning by practice of the invention.

DESCRIPTION OF EMBODIMENTS

When a region to be accessed includes a plurality of burst transmission regions, a memory controller outputs a plurality of access commands to a semiconductor memory. In the wrapping burst transmission, when an address to be accessed is included in a region between two of the burst transmission regions, the memory controller may perform the wrapping burst transmission on the two regions before and after the address to be accessed.

Figure 1:
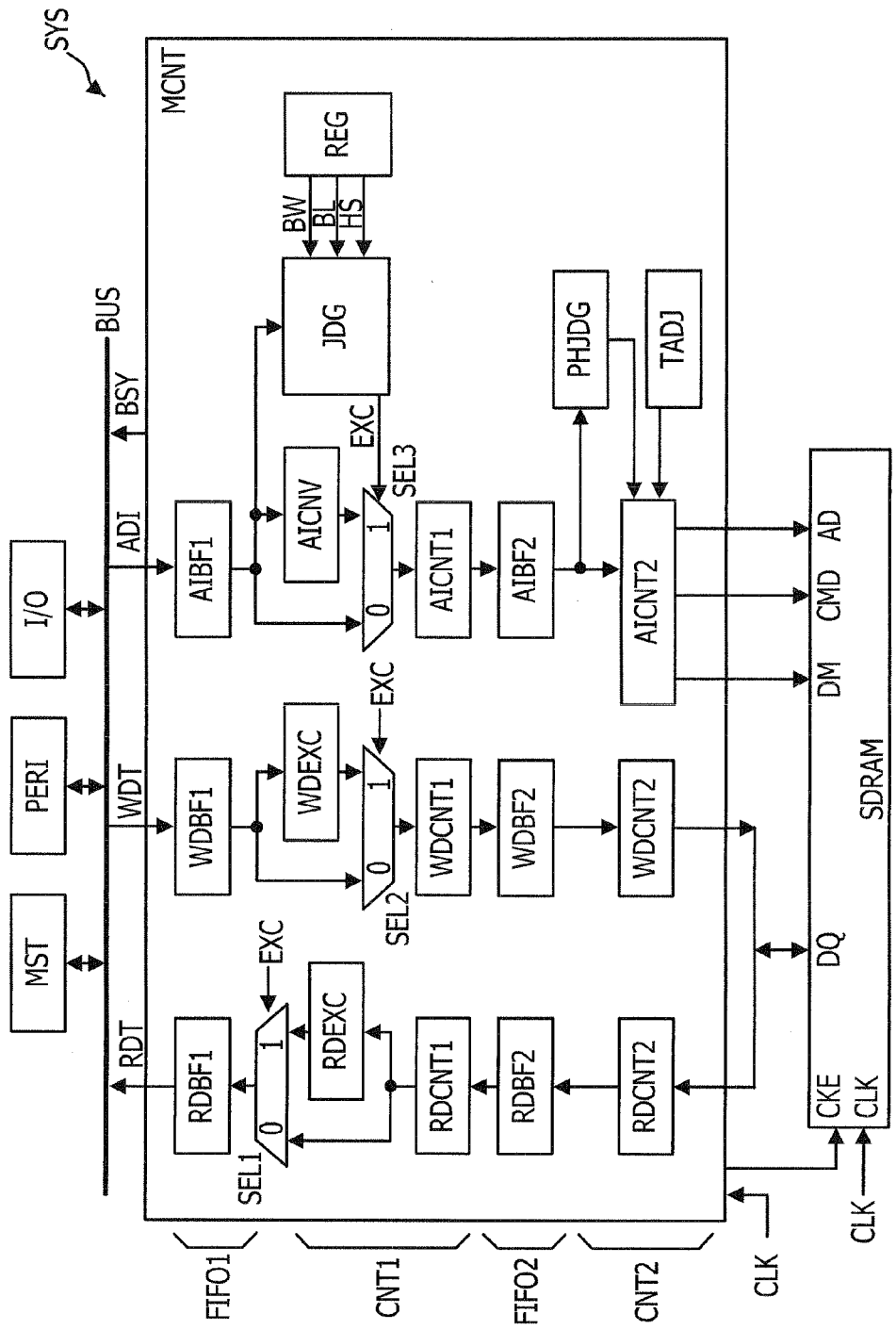
FIG. 1 illustrates an exemplary system.

FIG. 1 illustrates an exemplary system. For example, a system SYS includes a master controller MST, a peripheral circuit PERI, an input/output interface I/O, and a memory controller MCNT which are coupled to a bus BUS, and a semiconductor memory, such as an SDRAM, accessed by the memory controller MCNT. The semiconductor memory may include a semiconductor memory having a wrapping burst transmission function, such as an SRAM or a ferroelectric memory. In the wrapping burst transmission, data may be written in a memory block having a given area in a circulating manner in response to an access command. In the wrapping burst transmission, data may be read from a memory block having a given area in a circulating manner in response to an access command.

The master controller MST may be a CPU (Central Processing Unit) or a DMAC (Direct Memory Access Controller) which controls the entire operation of the system SYS. The peripheral circuit PERI may include an image control circuit such as an MPEG (Moving Picture Experts Group) controller. The input/output interface I/O may include a USB (Universal Serial Bus) interface circuit, for example. The SDRAM operates in synchronization with a clock signal CLK while receiving a high-level clock enable signal CKE. The clock enable signal CKE is output from the memory controller MCNT. However, the clock enable signal CKE may be output from the master controller MST. The SDRAM includes a plurality of command terminals CMD, a plurality of address terminals AD, a plurality of data mask terminals DM, and a plurality of data terminals DQ. For example, each of the command terminals CMD receives a chip selecting signal, a write enable signal, or an output enable signal. Each of the data mask terminals DM receives a data mask signal used to mask write data in a burst transmission.

The system SYS includes at least portion of a control substrate included in a cellular phone or a digital still camera, for example. For example, the master controller MST, the peripheral circuit PERI, the input/output interface I/O, the memory controller MCNT, and the SDRAM may be formed on a single LSI chip as an SoC (System on Chip) and mounted on the control substrate. The SDRAM may be mounted on the control substrate as a single chip. The system SYS may include the master controller MST, the memory controller MCNT, and a semiconductor memory such as an SDRAM.

The memory controller MCNT includes buffer circuits FIFO1 and FIFO2 and control circuits CNT1 and CNT2. The buffer circuit FIFO1 includes a read data buffer RDBF1, a write data buffer WDBF1, and an address information buffer AIBF1. The buffer circuit FIFO2 includes a read data buffer RDBF2, a write data buffer WDBF2, and an address information buffer AIBF2.

The control circuit CNT1 includes a read-data control circuit RDCNT1, a read-data sorting circuit RDEXC, a read selector SEL1, a write-data sorting circuit WDEXC, a write selector SEL2, a write-data control circuit WDCNT1, an address information changing circuit AICNV, an address selector SEL3, an address information control circuit AICNT1, a sorting determination circuit JDG, and a register REG. The control circuit CNT2 includes a read-data control circuit RDCNT2, a write-data control circuit WDCNT2, an address information control circuit AICNT2, a page-hit determination circuit PHJDG, and a timing control circuit TADJ.

Access requests supplied from the master controller MST are successively stored, for example, in the address information buffer AIBF1, e.g., the buffer circuit FIFO1 as address information ADI. The address information ADI may be referred to as a transaction. The address information ADI includes read/write information RW (a read access request/a write access request), an access request address BGN, a data transmission size DSIZE, a burst length BBL, and a burst type BTYP. The data transmission size DSIZE may be set to the n-th power of two (n is a positive integer). The burst length BBL indicates the number of data transmitted between the master controller MST and the memory controller MCNT.

The burst type BTYP is set to "incrementing", "wrapping", or "fixed". When a memory area of the SDRAM is accessed subsequently starting from the access request address BGN, "Incrementing" is set. When a memory area set in accordance with the data transmission size DSIZE is accessed in a circulating manner, "wrapping" is set. When data is repeatedly read from a portion designated by a certain address for monitoring of a status flag, for example, "fixed" is set. The burst type BTYP is set to the memory controller MCNT by the master controller MST.

The sorting determination circuit JDG determines whether write data or read data is to be sorted so that the SDRAM is efficiently accessed, and determines whether the access request addresses BGN is to be changed. The sorting determination circuit JDG outputs a sorting signal EXC representing an active level, e.g., "logic 1", when sorting data and changing addresses. The sorting determination circuit JDG outputs a sorting signal EXC representing an inactive level, i.e., "logic 0", for example, when not sorting data and not changing addresses.

The sorting determination circuit JDG determines whether a sorting operation is to be performed in accordance with the address information ADI, and a bus width BW, a burst length BL, and a high-speed mode HS which are supplied from the register REG. The burst length BL represents a number of data which are consecutively written into the SDRAM in response to an access command or a number of data which are consecutively read from the SDRAM in response to an access command. The bus width BW represents a number of bits of each of the data terminals DQ of the SDRAM. Due to the sort of the data and the change of the addresses, a number of access commands to be supplied to the SDRAM may be reduced and a data transmission rate may be improved.

Figure 4:
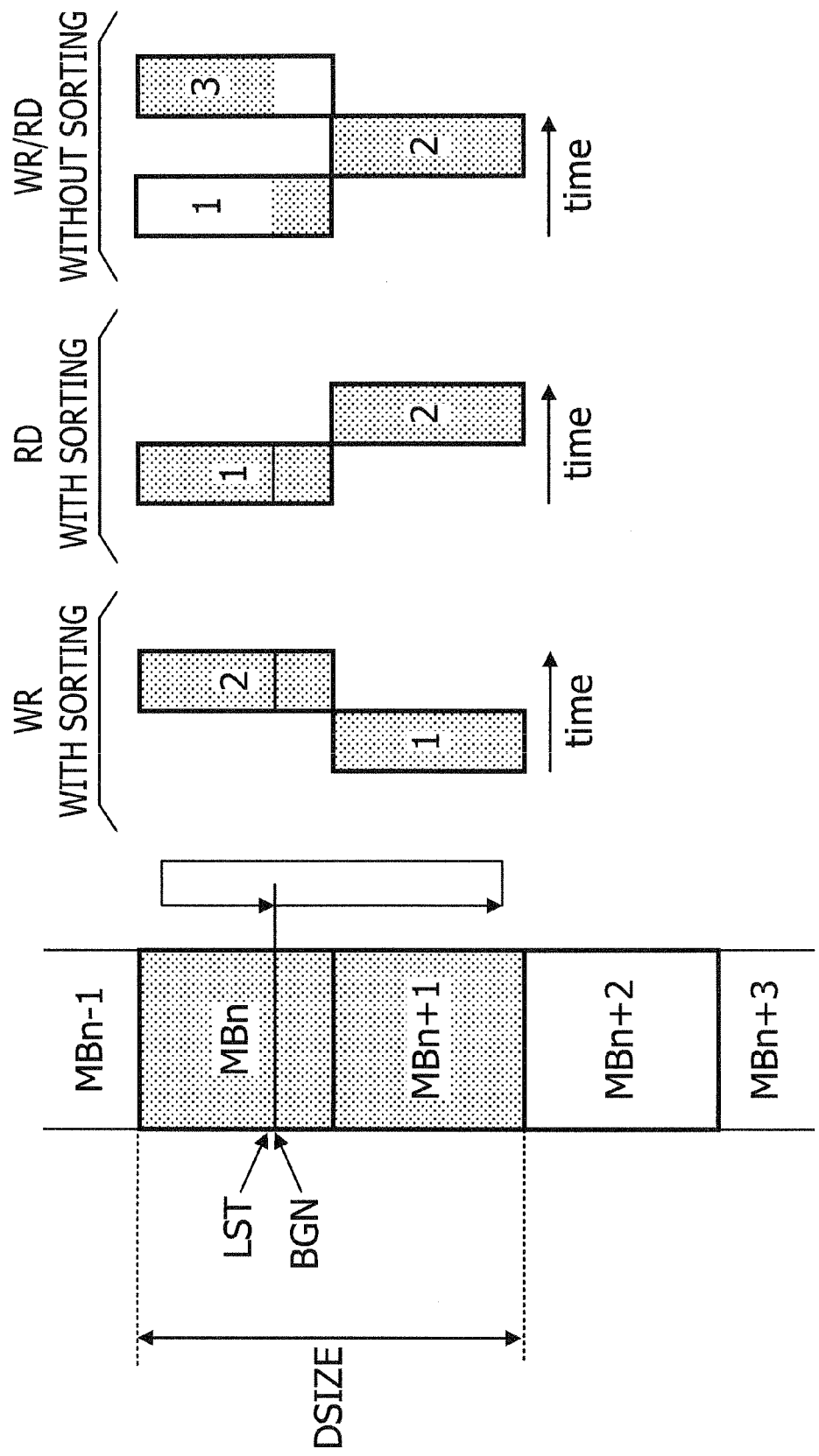
FIG. 4 illustrates an exemplary SDRAM.

For example, when the access request address BGN corresponds to a leading address of a memory area of the SDRAM which is to be accessed in one burst transmission, for example, a memory block MB illustrated in FIG. 4, data sorting and address changing may not be performed. A determination as to whether the access request address BGN corresponds to a leading address is made in accordance with the bus width BW and the burst length BL of the SDRAM. The sorting determination circuit JDG obtains the sizes of memory areas in accordance with a product of the bus width BW and the burst length BL, and obtains the leading addresses of the memory areas and intervals between two of the leading addresses. When the access request address BGN does not correspond to a leading address, the sorting determination circuit JDG sets the sorting signal EXC to "logic 1", so that the data sorting and the address changing are performed.

When the burst type BTYP represents "incrementing" or "fixed", data sorting and address changing are not performed. The sorting determination circuit JDG activates the sorting signal EXC to "logic 0". For example, even when the burst type BTYP corresponds to "wrapping", if a data transmission size is substantially equal to or smaller than a memory area of the SDRAM to be accessed in a burst transmission, data sorting and address changing may not be performed.

When the high-speed mode HS has been set, the sorting signal EXC is activated, and the data sorting and the address changing may not be performed. In a write access, the high-speed mode HS is set when write data WDT is to be rapidly written into the SDRAM. When reducing a write latency WL, data sorting may not be performed. The write latency WL represents a number of clock cycles from the time that the master controller MST outputs a write access request WR (transaction) to the memory controller MCNT to the time that the first write data is output to the SDRAM.

In a read access, the high-speed mode HS is set when read data RDT is to be rapidly output to the bus BUS. When reducing a read latency RL, the data sorting may not be performed. The read latency RL represents a number of cycles from the time that an access request (transaction) is supplied from the bus BUS to the memory controller MCNT to the time that the read data RDT is output from the memory controller MCNT to the bus BUS. The read data RDT is output to an external read bus in the bus BUS. The write data WDT is output to an external write bus in the bus BUS. The external read bus and the external write bus may be separately arranged or may be arranged as a common signal line.

Information on the high-speed mode HS may be supplied from the bus BUS to the sorting determination circuit JDG instead of being set in the register REG. The sorting determination circuit JDG may identify the high-speed mode HS in accordance with a memory area to be accessed. When data is to be rapidly read from a memory region, the sorting signal EXC may be deactivated.

The address information changing circuit AICNV changes a value of the access request address BGN supplied from the address information buffer AIBF1 when the sorting signal EXC is in the active state. The address selector SEL3 selects the access request address BGN supplied from the address information buffer AIBF1 when the sorting signal EXC is in the inactive state. The address selector SEL3 selects the access request address BGN supplied from the address information changing circuit AICNV when the sorting signal EXC is in the active state. When the sorting signal EXC corresponds to "logic 0", the access request address BGN is transmitted to the address information control circuit AICNT1 without using the address information changing circuit AICNV. The read/write information RW, the data transmission size DSIZE, the burst length BBL, and the burst type BTYP are transmitted from the address information buffer AIBF1 to the address information control circuit AICNT1.

The address information control circuit AICNT1 divides the address information (transaction) supplied from the address selector SEL3 so as to obtain address information (access request) submitted to a command system of the SDRAM. The address information buffer AIBF2 may sequentially store the address information supplied from the address information control circuit AICNT1. The address information stored in the address information buffer AIBF2 include a plurality of access commands such as read commands or write commands and access starting addresses corresponding to the access commands. The plurality of access commands may be consecutively supplied.

The address information control circuit AICNT2 receives the address information supplied from the address information buffer AIBF2 and generates access commands and access starting addresses to be output to the SDRAM in accordance with information supplied from the page-hit determination circuit PHJDG and information supplied from the timing control circuit TADJ. The access commands include read commands, write commands, active commands, precharge commands, and all-bank precharge commands. When a range of the addresses are smaller than a range accessed in one burst transmission operation of the SDRAM, the address information control circuit AICNT2 outputs a data mask signal DM for a memory area not to be accessed.

The page-hit determination circuit PHJDG outputs information indicating a page hit to the address information control circuit AICNT2 when the SDRAM is in an active state and the access starting addresses are included in addresses of a page in an active state. A single page of the SDRAM may correspond to data to be latched by a sense amplifier in response to an active command or may correspond to data to be stored in a memory cell coupled to a word line selected in response to an active command.

When the SDRAM is in a standby state, for example, a precharge state, the page-hit determination circuit PHJDG outputs information indicating a page miss to the address information control circuit AICNT2. The address information control circuit AICNT2 outputs the access starting addresses AD such as row addresses and active commands CMD, before outputting the access commands CMD such as write commands or read commands. When the access starting addresses AD is not included in addresses of the page in the active state, the page-hit determination circuit PHJDG outputs information indicating a page miss to the address information control circuit AICNT2. Before outputting the access commands CMD such as write commands or read commands, the address information control circuit AICNT2 outputs precharge commands CMD so as to set the page in the active state to a standby state. The address information control circuit AICNT2 outputs the active commands CMD along with the access starting addresses AD such as the row addresses and sets a new page to an active state. When the access starting addresses AD is included in the addresses of the page in the active state, the page-hit determination circuit PHJDG outputs information indicating a page hit to the address information control circuit AICNT2. The address information control circuit AICNT2 outputs access commands CMD such as write commands or read commands and access starting addresses AD such as column addresses.

The timing control circuit TADJ adjusts an interval of supplying an access command CMD and an access starting address AD output from the address information control circuit AICNT2, for example, a number of clock cycles. For example, the timing control circuit TADJ controls the address information control circuit AICNT2 so that an active command is output after a given period from a precharge command being output.

The write data WDT supplied from the master controller MST together with the write access request are stored in the write data buffer WDBF1, for example, the buffer circuit FIFO1. The write-data sorting circuit WDEXC sorts the write data WDT when the sorting signal EXC is in an active level. The write data WDT are sorted so that the write data are collectively written to a memory area to be accessed in a burst transmission of the SDRAM.

The write selector SEL2 selects the write data supplied from the write-data sorting circuit WDEXC when the sorting signal EXC is in the active state. The write selector SEL2 selects write data supplied from the write data buffer WDBF1 when the sorting signal EXC is inactive state. When the sorting signal EXC corresponds to "logic 0", the write data is transmitted to the write-data control circuit WDCNT1 without using the write-data sorting circuit WDEXC. In a burst transmission, when a frequency of a supply of the write data from the bus BUS is higher than a frequency of a writing of the write data to the SDRAM, the memory controller MCNT outputs a busy signal BSY. When receiving the busy signal BSY, the master controller MST stores the write data being output and may not newly output the write data items WDT.

The write-data control circuit WDCNT1 modifies a format of the write data supplied from the write selector SEL2 in accordance with a specification of the SDRAM, for example, a number of bits of the data, and outputs the modified write data to the write data buffer WDBF2. The write data buffer WDBF2, for example, the buffer circuit FIFO2 stores the write data supplied from the write-data control circuit WDCNT1. The write-data control circuit WDCNT2 modifies the write data stored in the write data buffer WDBF2 in accordance with the specification of the SDRAM, for example, a timing specification, and outputs the modified write data to the data terminals DQ. The write-data control circuit WDCNT2 outputs the write data which have been sorted by the write-data sorting circuit WDEXC to the SDRAM.

The read-data control circuit RDCNT2 transmits read data output from the data terminals DQ of the SDRAM to the read data buffer RDBF2 in response to a read access request. The read data buffer RDBF2, for example, the buffer circuit FIFO2 stores the read data and outputs the read data to the read-data control circuit RDCNT1. The read-data control circuit RDCNT1 modifies formats of the read data stored in the read data buffer RDBF2 in accordance with a specification of the bus BUS such as a timing specification, a number of bits of the data, or a number of data transmissions.

The read-data sorting circuit RDEXC sorts the read data when the sorting signal EXC is in an active level. The read data are sorted so as to be collectively read from a region accessed in a burst transmission. The read selector SEL1 selects read data supplied from the read-data sorting circuit RDEXC when the sorting signal EXC is in the active state. The read selector SEL1 selects read data supplied from the read-data control circuit RDCNT1 when the sorting signal EXC is in an inactive state. When the sorting signal EXC corresponds to "logic 0", the read data are transmitted to the read data buffer RDBF1 without using the read-data sorting circuit RDEXC. The read data buffer RDBF1, for example, the buffer circuit FIFO1 stores the read data supplied from the read selector SEL1 and outputs the read data to the bus BUS as read data items RDT.

Figure 2:
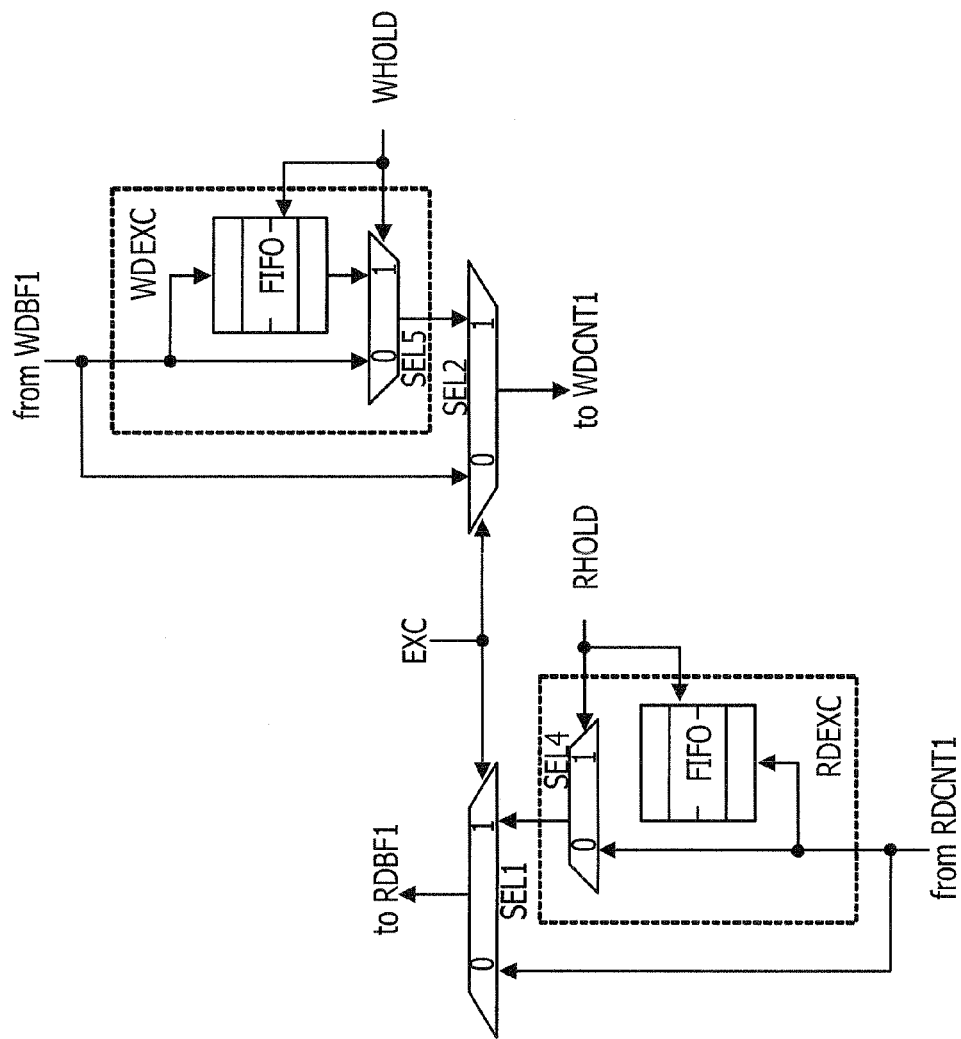
FIG. 2 illustrates an exemplary memory controller.

FIG. 2 illustrates an exemplary read-data sorting circuit and an exemplary write-data sorting circuit. The read-data sorting circuit and the write-data sorting circuit illustrated in FIG. 2 may correspond to the read-data sorting circuit RDEXC and the write-data sorting circuit WDEXC. The read-data sorting circuit RDEXC includes a read buffer circuit which stores at least a part of the read data supplied from the SDRAM, for example, FIFO and a read-sorting selector SEL4. The read buffer circuit, for example, FIFO temporarily stores, among the read data sequentially read from the SDRAM in the burst transmission, read data which are to be output later to the bus BUS. The read buffer circuit, for example, FIFO may store read data supplied when a read hold signal RHOLD is activated to "logic 1".

The read-sorting selector SEL4 selects the read data supplied from the read-data control circuit RDCNT1 when the read hold signal RHOLD is activated to "logic 0". The read-sorting selector SEL4 selects the read data supplied from the read buffer circuit FIFO when the read hold signal RHOLD is activated to "logic 1". For example, the read hold signal RHOLD may be output from the address information control circuit AICNT1. Since at least part of the read data is stored in the read buffer circuit, for example, FIFO, a number of clock cycles used to read the read data is increased, and the read data is sorted. The read data may be sorted in a small number of clock cycles.

The write-data sorting circuit WDEXC includes a write buffer circuit which sequentially stores the write data supplied from the bus BUS, for example, FIFO and a selector SEL5. The write buffer circuit FIFO temporarily stores, among the write data sequentially read from the bus BUS in the burst transmission, write data which are to be written later into the SDRAM. The write buffer circuit, for example, FIFO may store write data supplied when a write hold signal WHOLD is activated to "logic 1".

The selector SEL5 selects the write data supplied from the write data buffer WDBF1 when the write hold signal WHOLD is activated to "logic 0". The selector SEL5 selects the write data items supplied from the write buffer circuit FIFO when the write hold signal WHOLD is activated to "logic 1". For example, the write hold signal WHOLD is output from the address information control circuit AICNT1. The write data may be sorted by storing at least part of the write data in the write buffer circuit, for example, FIFO. A number of clock cycles used to write the write data items may be increased and the write data may be sorted. The write data may be sorted in a small number of clock cycles.

Figure 3:
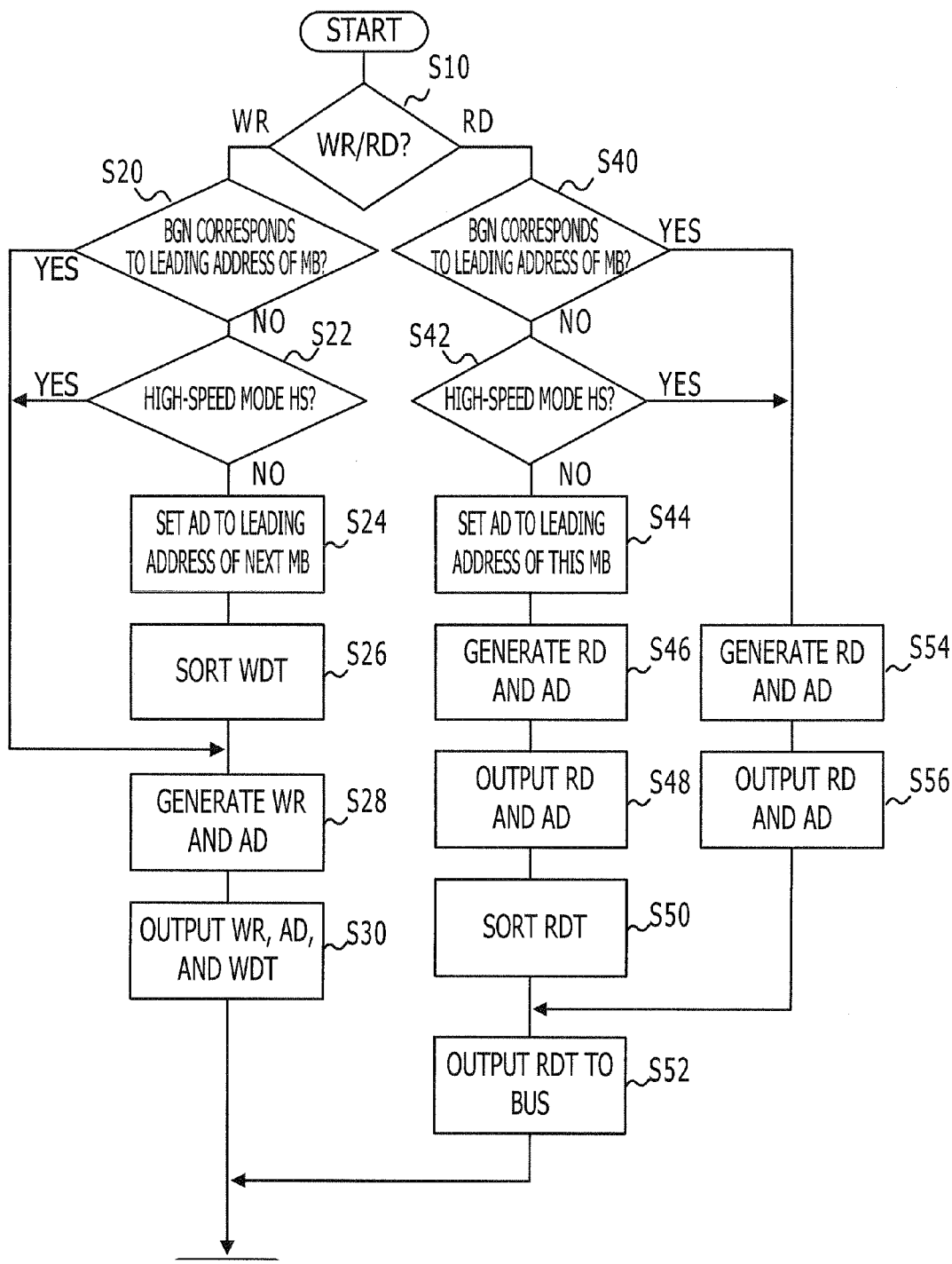
FIG. 3 illustrates an exemplary access operation.

FIG. 3 illustrates an exemplary operation of a memory controller. The operation of the memory controller illustrated in FIG. 3 may be performed by the memory controller MCNT illustrated in FIG. 1. In an operation S10, the memory controller MCNT determines whether an access request (transaction) supplied from the master controller MST is a write access request WR or a read access request RD. When receiving a write access request WR, the memory controller MCNT determines whether an access request address BGN corresponds to a leading address of a memory blocks MB to be accessed first in a wrapping burst transmission in an operation S20. When the access request address BGN corresponds to the leading address, the process proceeds to an operation S28. When the access request address BGN does not correspond to the leading address, the process proceeds to an operation S22.

In the operation S22, the memory controller MCNT determines whether a high-speed mode HS is set. When a high-speed mode HS is set in operation S22, the process proceeds to an operation S28 in order to reduce a write latency WL. When a high-speed mode HS is not set in the operation S22, the process proceeds to an operation S24 in order to sort the write data.

In the operation S24, the address information changing circuit AICNV sets an address AD to be supplied to the SDRAM, for example, an access starting address, to a leading address of a memory block MB which is to be accessed second in the wrapping burst transmission. In an operation S26, the write-data sorting circuit WDEXC sorts write data WDT.

In the operation S28, the memory controller MCNT generates a write command WR and a write address AD to be supplied to the SDRAM using the address information control circuit AICNT1. In an operation S30, the memory controller MONT outputs the write command WR, the write address AD, and the write data WDT to the SDRAM using the address information control circuit AICNT2 and the write-data control circuit WDCNT2.

When a read access request RD is supplied to the memory controller MCNT, the process proceeds to an operation S40. In the operation S40, the memory controller MCNT determines whether an access request address BGN corresponds to a leading address of a memory block MB of the SDRAM to be accessed in the wrapping burst transmission. When the access request address BGN corresponds to the leading address, the process proceeds to an operation S54. When the access request address BGN does not correspond to the leading address, the process proceeds to an operation S42.

In the operation S42, the memory controller MCNT determines whether the high-speed mode HS is set. When the high-speed mode HS is set, the process proceeds to an operation S54 in order to reduce a read latency RL. When the high-speed mode HS is not set, the process proceeds to an operation S44 in order to sort the read data.

In the operation S44, the address information changing circuit AICNV sets an address AD to be supplied to the SDRAM, for example, an access starting address, to the leading address of the memory block MB which is to be accessed first in the wrapping burst transmission. In an operation S46, the address information control circuit AICNT1 generates a read command RD and a read address AD to be supplied to the SDRAM. In an operation S48, the address information control circuit AICNT2 outputs the read command RD and the read address AD to the SDRAM. In an operation S50, the read-data sorting circuit RDEXC sorts the read data RDT to be output from the SDRAM.

In the operation S54, similarly to the operation S46, the address information control circuit AICNT1 generates a read command RD and a read address AD to be supplied to the SDRAM. In the operation S56, similarly to the operation S48, the address information control circuit AICNT2 outputs the read command RD and the read address AD to the SDRAM. In the operation S52, the read data buffer RDBF1 outputs the read data RDT to the bus BUS.

FIG. 4 illustrates an exemplary access to a SDRAM. The SDRAM illustrated in FIG. 4 may correspond to the SDRAM illustrated in FIG. 1. Memory blocks MB may be accessed in one burst transmission. The master controller MST specifies "wrapping" as the burst type BTYP of the memory controller MONT. Therefore, a memory area of the SDRAM corresponding to a data transmission size DSIZE is accessed in response to one access request. In FIG. 4, hatched areas correspond to data to be accessed. Numbers illustrated in frames in FIG. 4 denote an access order of the memory blocks MB to be accessed.

The data transmission size DSIZE transmitted for each access request (transaction) may be substantially the same as a sum of sizes of two of the memory blocks MB to be accessed in two wrapping burst transmissions. The access request address BGN supplied from the bus BUS to the memory controller MCNT is included in a memory block MBn, and the access request address BGN may be different from a leading address of the memory block MBn.

In a write access operation corresponding to the write access request WR (write command), when write data is sorted, the memory block MBn is accessed after a memory block MBn+1 is accessed. The memory controller MCNT sets a leading address of the memory block MBn+1 accessed after the memory block MBn including the access request address BGN to the access starting address AD. Even when the access request address BGN is different from the leading address of the memory block MBn, the write data is written to the memory blocks MBn and MBn+1 corresponding to the data transmission size DSIZE in response to two write access requests WR supplied to the SDRAM.

In a read access operation corresponding to the read access request RD (read command), when read data is sorted, the memory block MBn+1 is accessed after the memory block MBn is accessed. The memory controller MCNT sets the leading address of the memory block MBn including the access request address BGN to the access starting address AD. Even when the access request address BGN is different from the leading address of the memory block MBn, the read data is read from the memory blocks MBn and MNn+1 corresponding to the data transmission size DSIZE in response to two read access requests RD supplied to the SDRAM.

In a write access operation or a read access operation, when data is not sorted, the memory block MBn is accessed, again, after the memory blocks MBn and MBn+1 are sequentially accessed. A memory area is accessed circularly starting from the access request address BGN to the last address LST. The memory area may be accessed with three write access requests WR and three read access requests RD.

Figure 5:
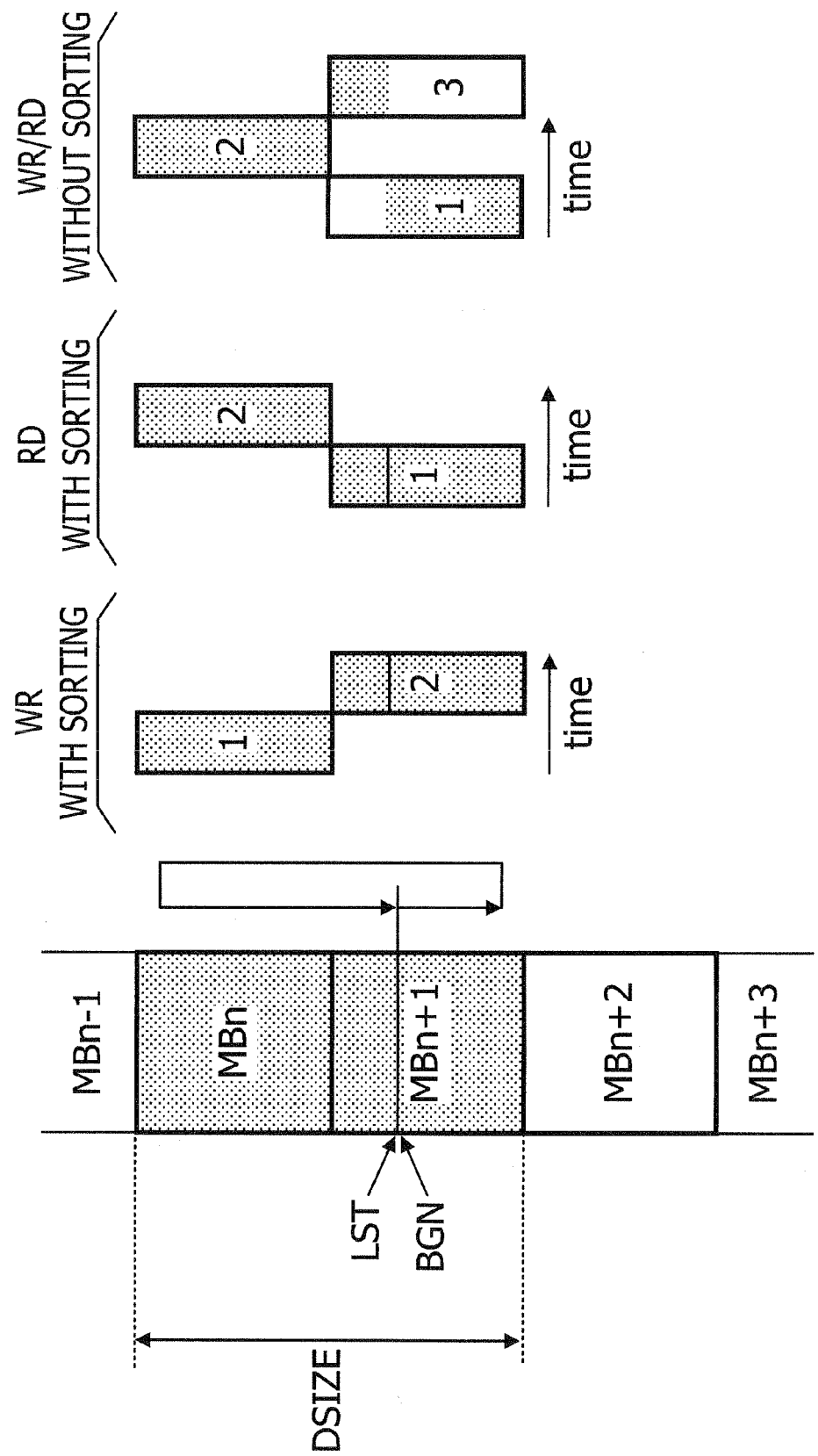
FIG. 5 illustrates an exemplary access to an SDRAM.

FIG. 5 illustrates an exemplary access to an SDRAM. The SDRAM illustrated in FIG. 5 may correspond to the SDRAM illustrated in FIG. 1. In FIG. 5, descriptions of operations substantially the same as or similar to the operations illustrated in FIG. 4 are omitted or reduced. Although the access request address BGN is included in the memory block MBn+1, the access request address BGN may be different from the leading address of the memory block MBn+1.

In a write access operation corresponding to a write access request WR, when write data is sorted, as illustrated in FIG. 4, the memory block MBn which is accessed after the memory block MBn+1 including the access request address BGN is first accessed. Even when the access request address BGN is different from the leading address of the memory block MBn+1, the write data is written to the SDRAM in response to two write access requests WR supplied to the SDRAM.

In a read access operation corresponding to a read access request RD, when read data is sorted, as illustrated in FIG. 4, the memory block MBn+1 including the access request address BGN is first accessed. Even when the access request address BGN is different from the leading address of the memory block MBn+1, the read data is read from the SDRAM in response to two read access requests RD supplied to the SDRAM.

In the write access operation or the read access operation, when the data is not sorted, the memory block MBn+1 is accessed again after the memory blocks MBn+1 and MBn are accessed sequentially. A memory area is accessed circularly starting from the access request address BGN to the last address LST. The memory area may be accessed by three write access requests WR or three read access requests RD.

Figure 6:
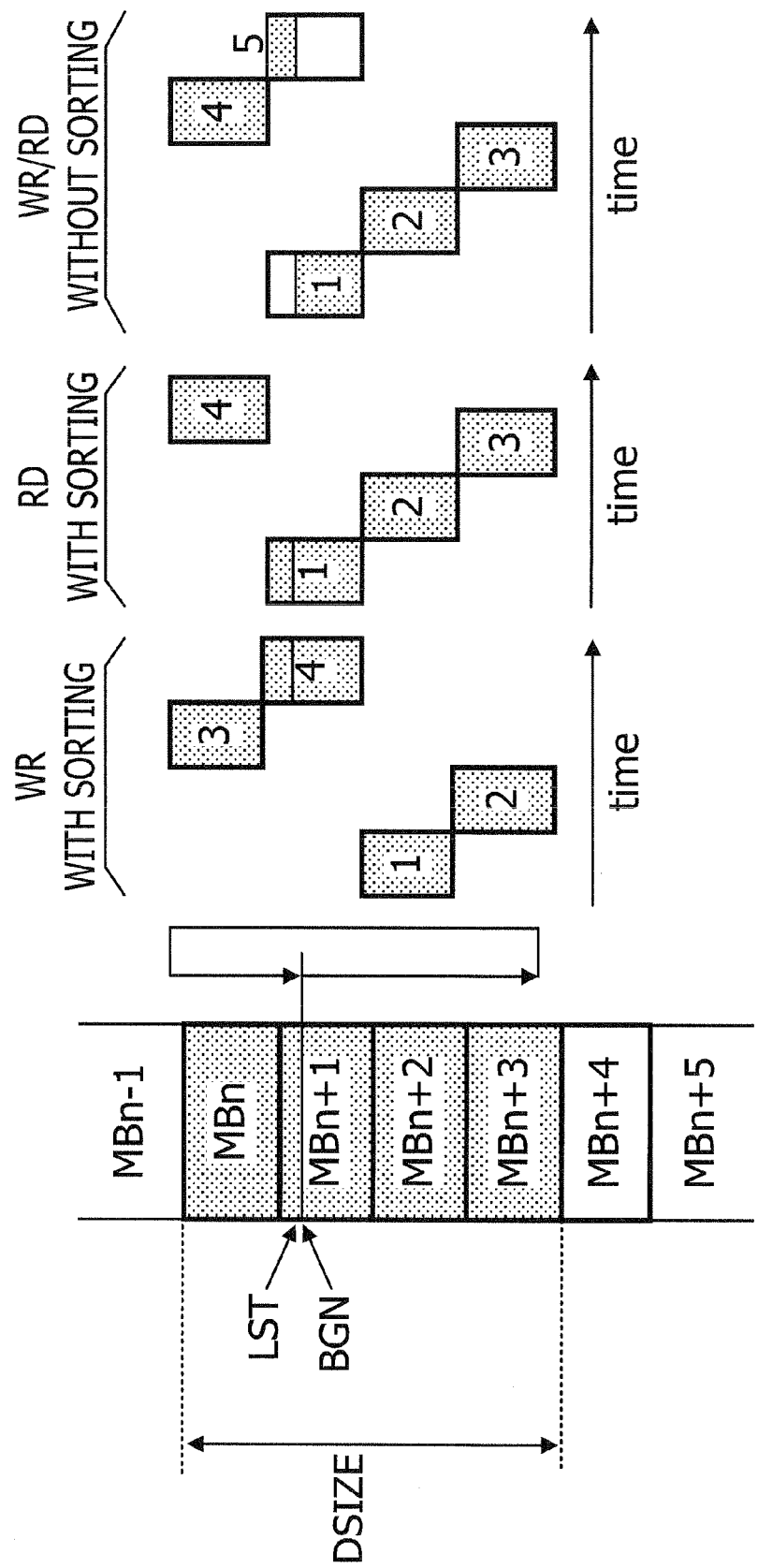
FIG. 6 illustrates an exemplary access to an SDRAM.

FIG. 6 illustrates an exemplary access to an SDRAM. The SDRAM illustrated in FIG. 6 may correspond to the SDRAM illustrated in FIG. 1. In FIG. 4, descriptions of operations substantially the same as or similar to the operations illustrated in FIG. 4 are omitted or reduced. The data transmission size DSIZE which is transmitted for each access request may be substantially equal to a size of four memory blocks MB to be accessed in four wrapping burst transmissions of the SDRAM. Although the access request address BGN is included in the memory block MBn+1, the access request address BGN may be different from the leading address of the memory block MBn+1. When "wrapping" is specified as the burst type BTYP, a memory address of the SDRAM corresponding to the data transmission size DSIZE is accessed in response to an address request.

In a write access operation corresponding to a write access request WR, when write data is sorted, similarly to FIG. 4, a memory block MBn+2 after the memory block MBn+1 including an access request address BGN is first accessed. Even when the access request address BGN is different from the leading address of the memory block MBn+1, the write data is written to the SDRAM in response to four write access requests WR supplied to the SDRAM.

In a read access operation performed corresponding to a read access request RD, when read data is sorted, as illustrated in FIG. 4, the memory block MBn+1 including the access request address BGN is first accessed. Even when the access request address BGN is different from the leading address of the memory block MBn+1, the read data is read from the SDRAM in response to four read access requests RD supplied to the SDRAM.

In the write access operation or the read access operation, when the data is not sorted, the memory block MBn+1 is accessed again after the memory blocks MBn+1, MBn+2, MBn+3 and MBn are accessed. A memory region is accessed circularly starting from the access request address BGN to the last address LST. The memory area may be accessed by five write access requests WR or five read access requests RD.

Figure 7:
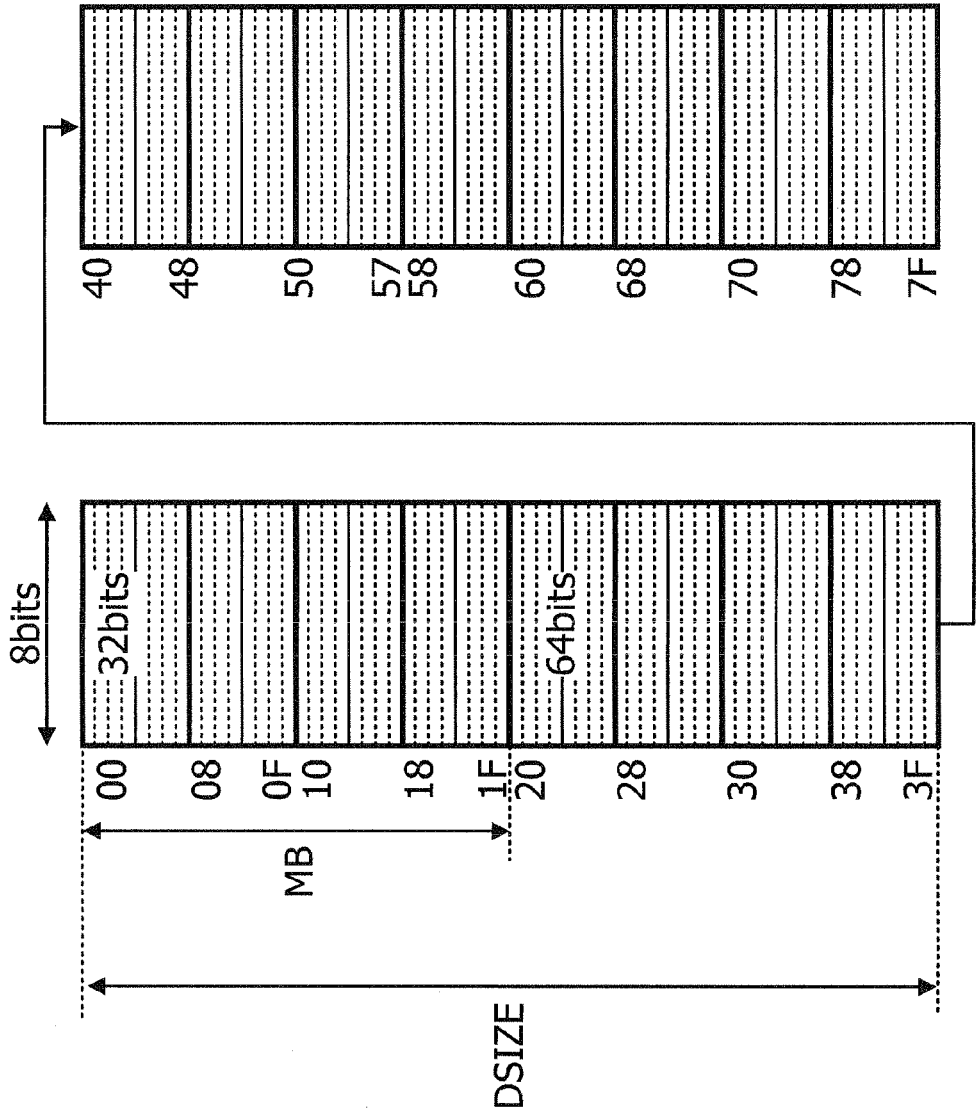
FIG. 7 illustrates an exemplary memory map.

FIG. 7 illustrates an exemplary memory map. An SDRAM including the memory map illustrated in FIG. 7 may correspond to an SDRAM illustrated in FIG. 1. Numbers representing addresses are indicated in hexadecimal notation. For example, the data terminals DQ may correspond to 32 bits. When the burst length BL set to a mode register is "8", a memory block MB accessed by one burst transmission corresponds to 256 bits. A single memory block MB may include an address space in a range from "00" to "1F".

The data transmission size DSIZE transmitted between the bus BUS and the memory controller MCNT for each access request may be substantially equal to a size of two memory blocks MB. For example, data lines in the bus BUS may be 64 bits. A burst length of data in the bus BUS (hereinafter referred to as a "bus burst length BBL" where appropriate) may be "8".

Figure 8:
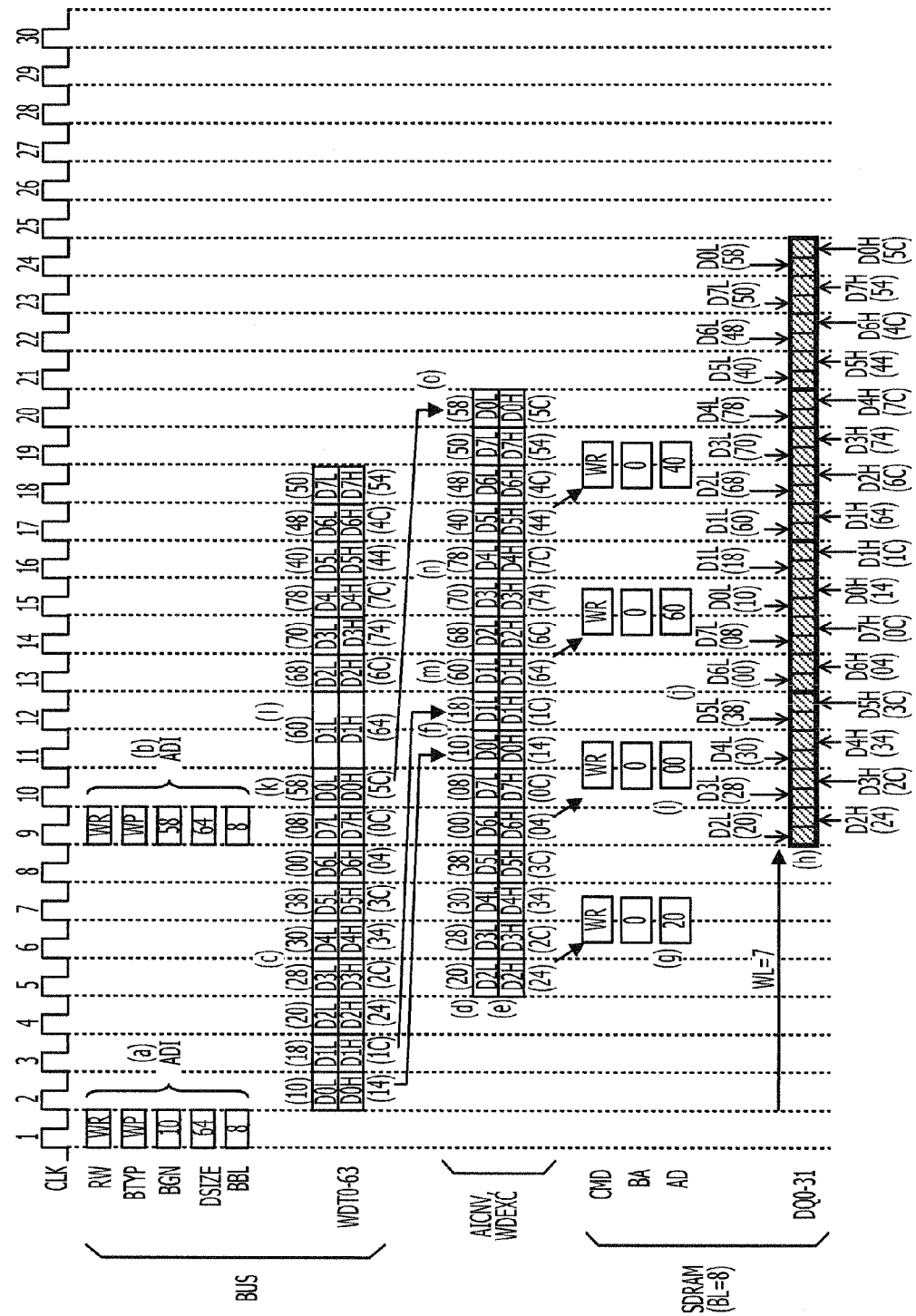
FIG. 8 illustrates an exemplary write access to an SDRAM.

FIG. 8 illustrates an exemplary access to an SDRAM. The SDRAM illustrated in FIG. 8 may correspond to the SDRAM illustrated in FIG. 1. In FIG. 8, a DDR (Double Data Rate) type SDRAM having 32-bit data terminals DQ0-31 is accessed. A burst length BL of the SDRAM may be "8". Access request addresses BGN (10 and 58; in hexadecimal notation) supplied from the master controller MST to the bus BUS may be different from leading addresses of the memory blocks MB as illustrated in FIG. 7. The sorting determination circuit JDG activates the sorting signal EXC for sorting the write data in response to write access requests WR supplied from the master controller MST. Address information ADI may serve as write access requests WR (transactions) ((a), (b) in FIG. 8). The write access requests WR may serve as the read/write information RW. The burst type BTYP may correspond to "wrapping WP". The access request address BGN may be "10" or "58". The data transmission size DSIZE may be 64 bits. The burst length BBL may be "8".

In response to the first write access request WR, the master controller MST outputs the 64-bit write data WDT0 to WDT63 at eighth times to the bus BUS starting from the second clock cycle ((c) in FIG. 8). For simplicity of description, the write data WDT0 to WDT63 are divided into lower 32 bits including a write data D0L and upper 32 bits including a write data D0H. Numbers included in frames representing the write data denote an order of the write data to be supplied to the bus BUS. Numbers illustrated in parentheses arranged on and below the frames representing the write data denote addresses of the SDRAM to which the write data is written. For example, addresses supplied from the master controller MST to the bus BUS may be substantially the same as addresses of the SDRAM.

As illustrated in operation S24 of FIG. 3, the address information changing circuit AICNV sets the access starting address AD to a leading address (20) of the second memory block MB ((d) of FIG. 8). In two clock cycles in which the write data D0L, D0H, D1L, and D1H is supplied to the write-data sorting circuit WDEXC, the write hold signal WHOLD is activated. The write-data sorting circuit WDEXC stores the write data D0L, D0H, D1L and D1H, which are supplied first and second supplied, in the write buffer circuit, for example, FIFO. The write buffer circuit FIFO sequentially stores write data corresponding to addresses in a range from the access request address BGN to the last address of the memory block MB including the access request address BGN.

The write-sorting selector SEL5 included in the write-data sorting circuit WDEXC sequentially outputs write data D2L and D2H to write data D7H and D7L to the write-data control circuit WDCNT1 through the write selector SEL2 ((e) in FIG. 8). After outputting the write data D7H and D7L, the write-sorting selector SEL5 sequentially outputs the write data D0L, D0H, D1L, and D1H, which is stored in the write buffer circuit FIFO, to the write-data control circuit WDCNT1 through the write selector SEL2 ((f) in FIG. 8). the write data are sorted as illustrated in operation S26 of FIG. 3. The write-sorting selector SEL5 sequentially selects the write data corresponding to addresses in a range from the leading address of the memory block MB next to the memory block MB including the access request address BGN to an address immediately before the access request address BGN, and thereafter, sequentially selects the write data which is stored in the write buffer circuit, for example, FIFO.

The address information control circuit AICNT2 outputs the converted address AD (20) to the SDRAM along with a write command WR ((g) in FIG. 8). A bank address BA may be "0", for example. The SDRAM may have received an active command and may be in an active state such as a page-hit state. The write-data control circuit WDCNT2 sequentially outputs the write data D2L, D2H ... D5L and D5H to the SDRAM two clocks behind the write command WR ((h) in FIG. 8). The write data are written to the SDRAM in synchronization with rising edges and trailing edges of the clock signal CLK. A write latency WL to the SDRAM may be "7".

A next write command WR is supplied to the SDRAM along with an address AD (00) ((i) in FIG. 8). The write data D6L, D6H ... D0L, D01, D1L and D1H are sequentially supplied and written to the SDRAM ((j) in FIG. 8). The write data D0L which is supplied first to the bus BUS is written to the SDRAM 14 clocks behind the first write access request WR (transaction), for example, in synchronization with the 15th clock signal CLK.

In response to the second write access request WR, the 64-bit write data WDT0 to WDT63 is output eighth times to the bus BUS starting from the 10th clock cycle ((k) in FIG. 8). Due to the data sorting in the preceding write cycle, an output of the write data from the write-data sorting circuit WDEXC may be delayed by two clock cycles. The memory controller MCNT outputs a busy signal BSY for one clock cycle in synchronization with a trailing edge of the 11th clock signal CLK. The master controller MST continues outputting the write data D1L and D1H in a clock cycle after receiving the busy signal BSY ((1) in FIG. 8). When the write data is sorted, collision of the write data does not occur in the memory controller MCNT and the memory controller MCNT may reduce malfunction.

In a write cycle corresponding to the second address information ADI, the address information changing circuit AICNV sets the access starting address AD to a leading address (60) of the next memory block MB ((m) in FIG. 8). The write-data sorting circuit WDEXC stores the write data D0L and D0H, which is first supplied, in the write buffer circuit FIFO. The write-data sorting circuit WDEXC sequentially outputs the write data D1L and D1H to write data D7H to D7L to the write-data control circuit WDCNT1 ((n) in FIG. 8). After outputting the write data D7H and D7L, the write-data sorting circuit WDEXC outputs the write data D0L and D0H stored in the write buffer circuit, for example, FIFO to the write-data control circuit WDCNT1 ((o) in FIG. 8). Similarly to the first write cycle, the memory controller MCNT supplies a write command WR and the sorted write data to the SDRAM and accesses the SDRAM.

For example, the master controller MST supplies a next write access request (transaction) in synchronization with the 15th clock signal CLK.

When the access request addresses BGN are different from the leading addresses of the memory blocks MB, the 512-bit write data corresponding to the write access requests WR supplied from the master controller MST is written to the SDRAM in response to two write commands WR. The data terminals DQ included in the SDRAM are efficiently used. A frequency of output of the busy signal BSY from the memory controller MCNT to the master controller MST is lowered, and the data lines included in the bus BUS are efficiently used. Access efficiency of the SDRAM and performance of the system SYS are improved.

Figure 9:
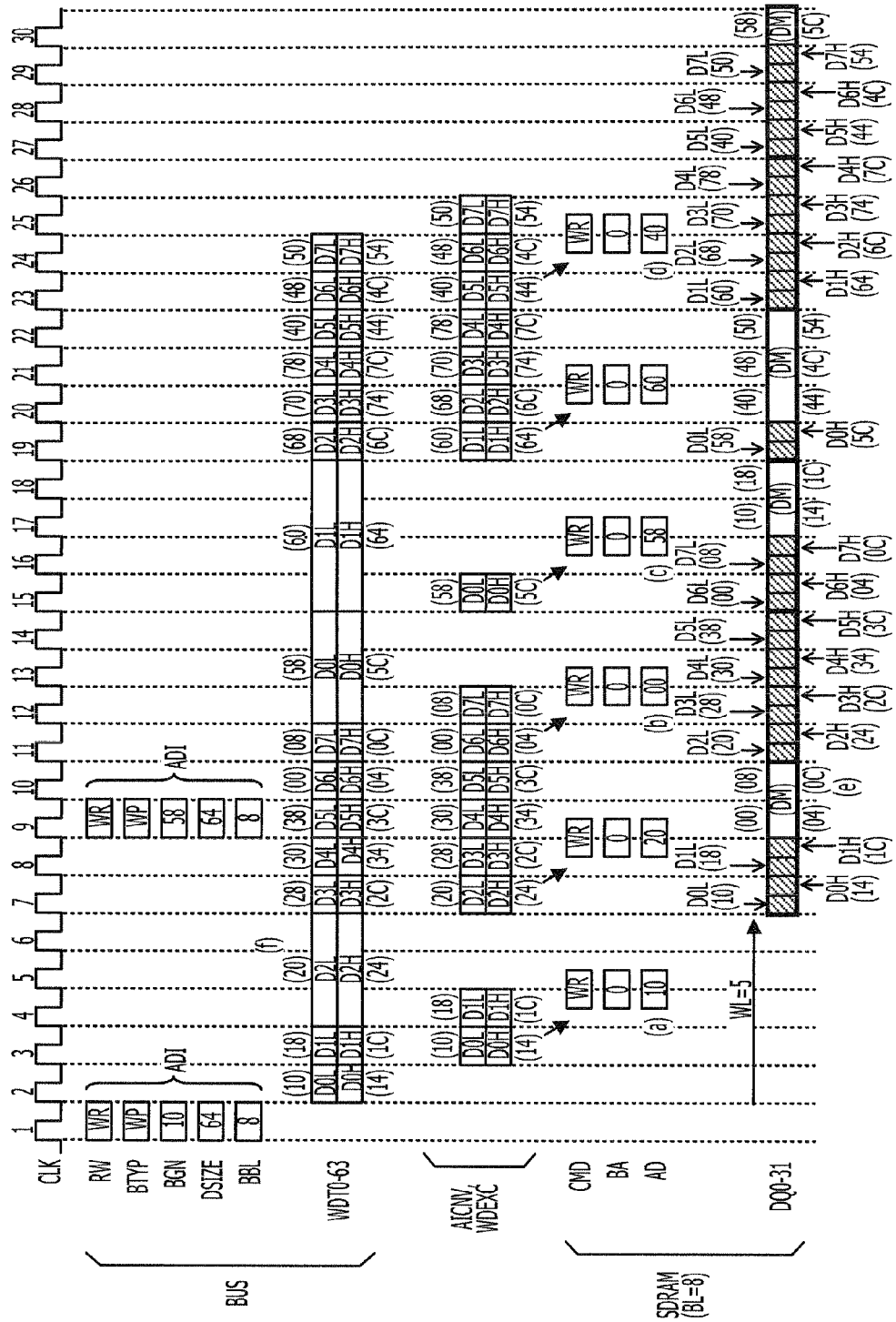
FIG. 9 illustrates an exemplary write access to an SDRAM.

FIG. 9 illustrates an exemplary access to an SDRAM. The SDRAM illustrated in FIG. 9 may correspond to the SDRAM illustrated in FIG. 1. In FIG. 9, descriptions of operations substantially the same as or similar to the operations illustrated in FIG. 8 are omitted or reduced. The SDRAM accessed by the memory controller MCNT may be substantially the same as or similar to the SDRAM illustrated in FIG. 8. Address information ADI supplied from the master controller MST to the memory controller MCNT may be substantially the same as the address information items illustrated in FIG. 8. Access request addresses BGN (10 and 58; in hexadecimal notation) supplied from the master controller MST to the bus BUS may be different from the leading addresses of the memory blocks MB. In FIG. 9, the high-speed mode HS is set to the register REG illustrated in FIG. 1, for example, and the sorting signal EXC is in an inactive state. Therefore, write data may not be sorted. The SDRAM may be in an active state such as a page-hit state based on an active command.

When the write data is not sorted, a memory block MB is accessed twice based on two addresses AD(10) and AD(00) ((a) and (b) in FIG. 9). The third memory block MB is accessed twice based on two addresses AD(58) and AD(40)

((c) and (d) in FIG. 9). The SDRAM receives eight write data corresponding to the burst length BL for each write access. A write data D0L, which is first supplied to the bus BUS, is written to the SDRAM behind five clocks after receiving a first write access request WR (transaction), for example, in synchronization with the seventh clock signal CLK. A write latency WL may be "5".

In a burst transmission in accordance with the address AD (10), the latter four write data corresponding to addresses AD (00), (04), (08) and (0C) may not be supplied from the master controller MST. The memory controller MCNT outputs a data mask signal DM to the SDRAM so as to reduce writing the latter write data ((e) in FIG. 9). In response to a data mask period DM, the memory controller MCNT outputs a busy signal BSY to the master controller MST.

While receiving the busy signal BSY, the master controller MST continues outputting the write data, e.g., the write data D2L and D2H ((f) in FIG. 9). Also in other write cycles, the data mask period DM is generated when one memory block MB is accessed twice. The frequency of output of the busy signal BSY is increased, and the data lines included in the bus BUS may be occupied frequently. Accordingly, efficiency in the use of the data terminals DQ included in the SDRAM and the data lines included in the bus BUS may be reduced.

For example, the master controller MST supplies a third write access request WR (transaction) at the 21st clock cycle or after the 21st clock cycle. When write data is not sorted, a frequency of supply of write access requests from the master controller MST to the memory controller MCNT is reduced. Access efficiency to the SDRAM may be reduced.

When the write data D0L which is first supplied to the bus BUS is to be rapidly written into the SDRAM, the high-speed mode HS is set to the memory controller MCNT.

Figure 10:
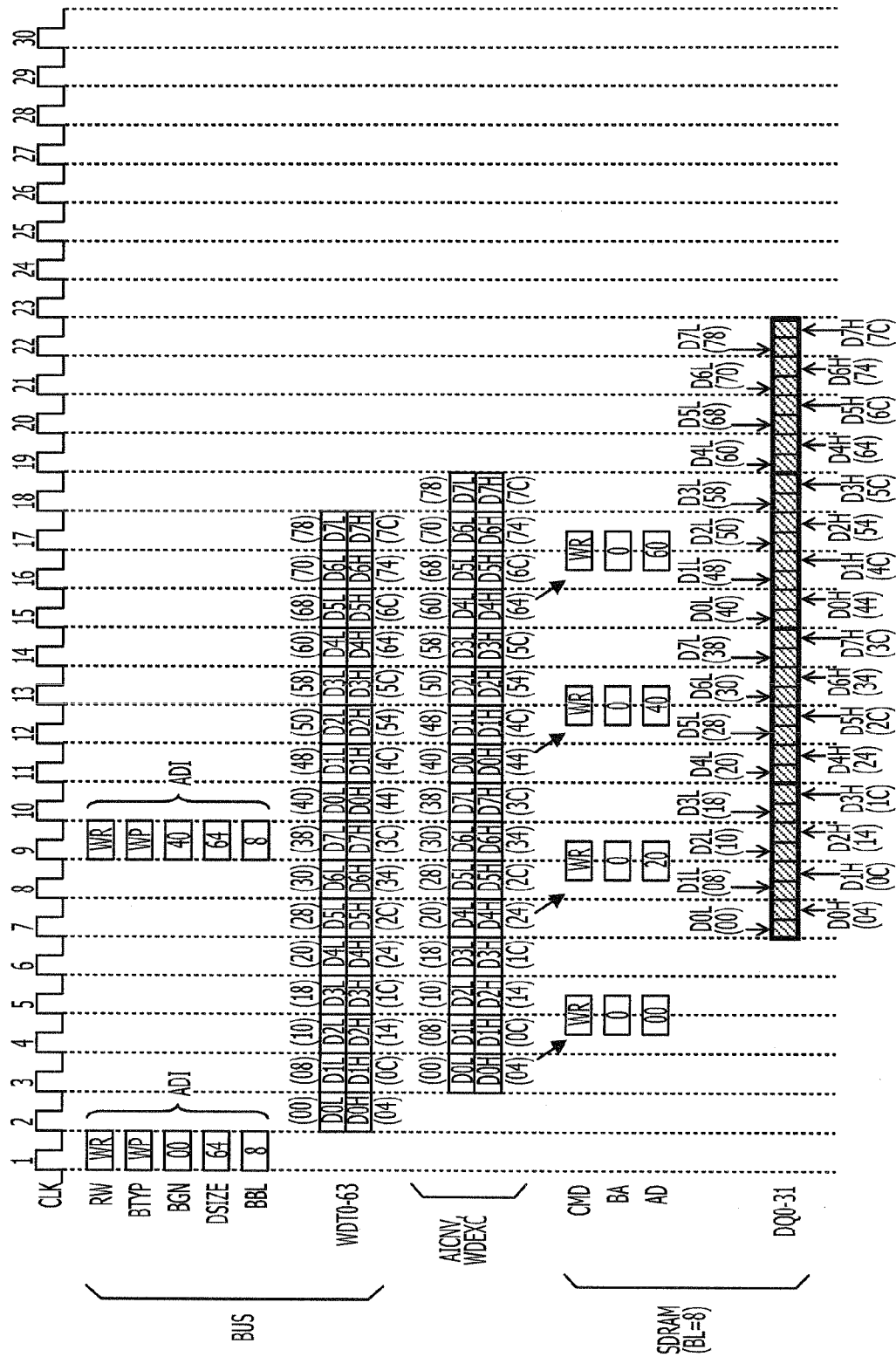
FIG. 10 illustrates an exemplary write access to an SDRAM.

FIG. 10 illustrates an exemplary access to an SDRAM. The SDRAM illustrated in FIG. 10 may correspond to the SDRAM illustrated in FIG. 1. In FIG. 10, descriptions of operations substantially the same as or similar to the operations illustrated in FIG. 8 are omitted or reduced. The SDRAM accessed by the memory controller MCNT may be substantially the same or similar to the SDRAM illustrated in FIG. 8. Address information ADI supplied to the memory controller MCNT may be substantially the same as or similar to the address information illustrated in FIG. 8. Access request addresses BGN (00) and (40) represent leading addresses of the memory blocks MB. The SDRAM may be in an active state such as a page-hit state based on an active command.

In FIG. 10, since the access request addresses BGN (00) and (40) correspond to the leading addresses of the memory blocks MB, the sorting determination circuit JDG outputs a sorting signal EXC representing that write-data sorting is not performed, for example, corresponding to "logic 0". As illustrated in FIG. 8, every time a write access request WR is supplied from the master controller MST, the memory controller MCNT supplies two write commands WR to the SDRAM and access the SDRAM. In FIG. 8, when the access request addresses BGN are different from the leading addresses of the memory blocks MB, the SDRAM is accessed in a short cycle time.

Figure 11:
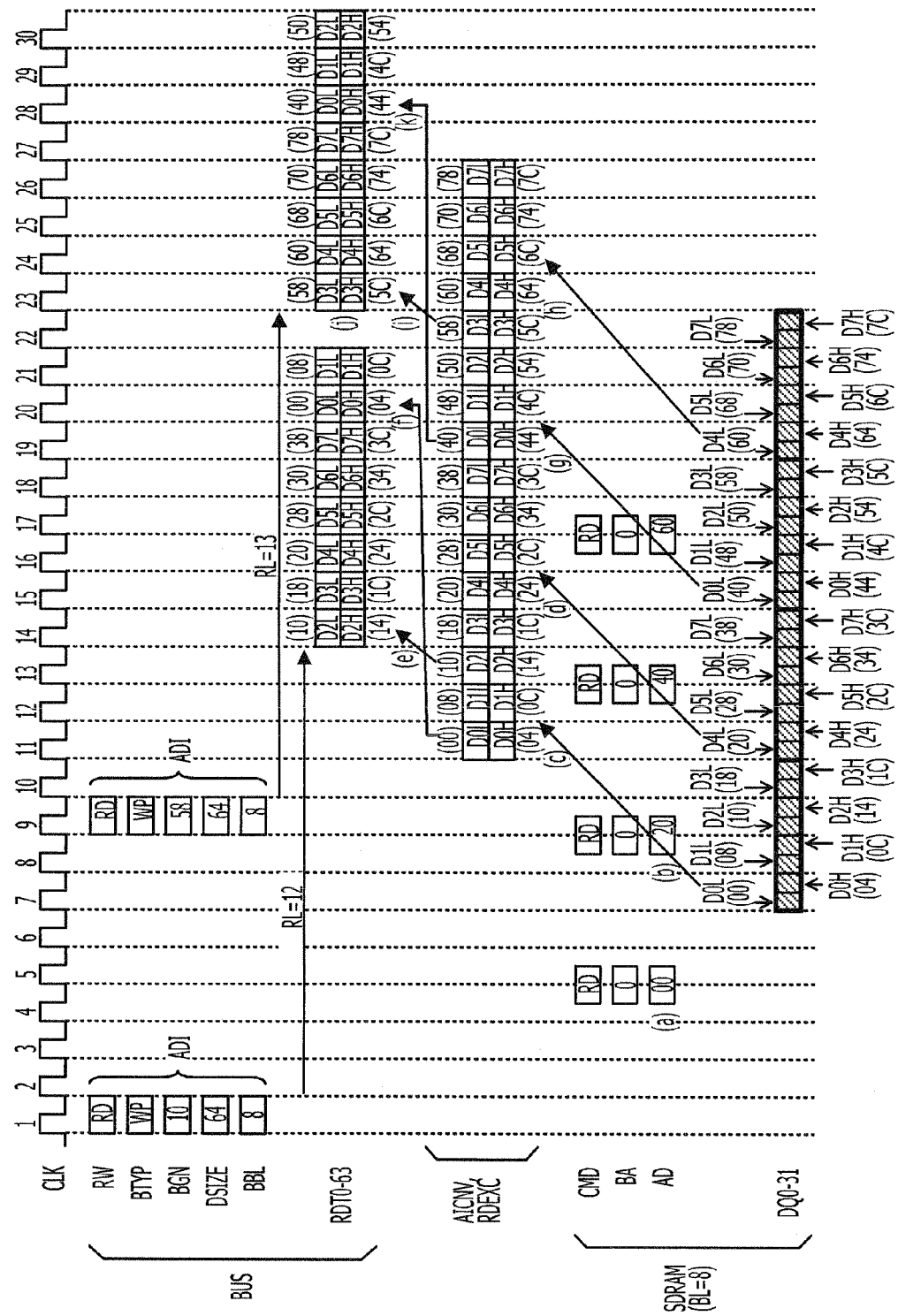
FIG. 11 illustrates an exemplary read access to an SDRAM.

FIG. 11 illustrates an access to an SDRAM. The SDRAM illustrated in FIG. 11 may correspond to the SDRAM illustrated in FIG. 1. In FIG. 11, descriptions of operations substantially the same as or similar to the operations illustrated in FIG. 8 are omitted or reduced. The SDRAM accessed by the memory controller MCNT may be substantially the same as or similar to the SDRAM illustrated in FIG. 8. Address information ADI supplied from the master controller MST to the memory controller MCNT may be substantially the same as or similar to the address information illustrated in FIG. 8. Read/write information RW may correspond to read access requests RD. Access request addresses BGN (10, 58; in hexadecimal notation) may be different from the leading addresses of the memory blocks MB. The sorting determination circuit JDG activates a sorting signal EXC in response to the read access requests RD supplied from the master controller MST. The SDRAM may be in an active state such as a page-hit state based on an active command.

The address information changing circuit AICNV sets access starting addresses AD to leading addresses (00) and (20) of the memory blocks MB. The memory controller MCNT sequentially outputs access signals AD(00) and AD(20) to the SDRAM together with read commands RD ((a) and (b) in FIG. 11). The memory controller MCNT sequentially receives read data D0L and D0H to read data D7L and D7h output from the SDRAM ((c) and (d) in FIG. 11).

In a period of two clock cycles when the read data D0L, D0H, D1L, and D1H are supplied to the read-data sorting circuit RDEXC, a read hold signal RHOLD is activated. The read-data sorting circuit RDEXC stores the first-supplied read data D0L and D0H and the second-supplied read data D1L and D1H in a read buffer circuit, for example, FIFO. The read buffer circuit (FIFO) sequentially stores read data supplied from the SDRAM which correspond to addresses in a range from the leading address of the memory block MB including the first access request address BGN to an address immediately before the access request address BGN.

The read-sorting selector SEL4 included in the read-data sorting circuit RDEXC sequentially outputs the read data D2L and D2H to the read data D7H and D7L to the read data buffer RDBF1 through the read selector SEL1 ((e) in FIG. 11). After outputting the read data D7H and D7L, the read-sorting selector SEL4 included in the read-data sorting circuit RDEXC sequentially outputs the read data D0L, D0H, D1L and D1H which is stored in the read buffer circuit (FIFO) to the read data buffer RDBF1 through the read selector SEL1 ((f) in FIG. 11). For example, the read data are sorted as illustrated in operation S50 of FIG. 3. The read-sorting selector SEL4 sequentially selects the read data supplied from the SDRAM which correspond to addresses in a range from the leading address of the memory block MB including the access request address BGN to the address immediately before the access request address BGN, and thereafter, sequentially selects the read data which is stored in the read buffer circuit (FIFO).

When receiving the second access request address BGN (58), the address information changing circuit AICNV sets access starting addresses AD to leading addresses (40) and (60) of the memory blocks MB. The memory controller MCNT supplies two read commands RD to the SDRAM, and the SDRAM sequentially outputs read data D0L and D0H to read data D7L and D7H ((g) and (h) in FIG. 11). The read-data sorting circuit RDEXC stores the first-supplied read data D0L and D0H, the second-supplied read data items D1L and D1H, and the third-supplied read data items D2L and D2H in the read buffer circuit (FIFO). The read-data sorting circuit RDEXC sequentially outputs the read data D3L and D3H to the read data D7L and D7H to the read data buffer RDBF1 ((i) in FIG. 11).

When an amount of read data stored in the read buffer circuit FIFO is large, the read data D3L and D3H, which are first output from the bus BUS from the read-data sorting circuit RDCNT1, is supplied to the read-data sorting circuit RDEXC slowly. The memory controller MCNT outputs a busy signal BSY to the bus BUS so that the master controller MST waits to receive the read data ((j) in FIG. 11). After outputting the read data D7H and D7L, the read-data sorting circuit RDEXC sequentially outputs the read data D0L, D0H, D1L, D1H, D2L and D2H stored in the read buffer circuit (FIFO) to the read data buffer RDBF1 (by (k) in FIG. 11). In the read access illustrated in FIG. 11, read latencies RL of the bus BUS may be "12" and "13". Each of the read latencies RL of the bus BUS may correspond to the number of clock cycles in a period from when the master controller MST outputs a corresponding the read access request RD (transaction) to the memory controller MCNT to when first read data is output to the bus BUS.

For example, the master controller MST supplies a next read access request (transaction) in synchronization with the 17th clock signal CLK. When the read data is sorted, a frequency of supply of read access requests from the master controller MST to the memory controller MCNT may be increased.

When an access request address BGN is different from the leading addresses of the memory blocks MB, 512-bit read data corresponding to the read access requests RD supplied from the master controller MST are read from the SDRAM in accordance with two read commands RD. Efficiency in the use of the data terminals DQ of the SDRAM is improved. Since a period of time in which the data lines included in the bus BUS are not used is reduced in the read access, efficiency in the use of the data lines in the bus BUS may be improved. Access efficiency to the SDRAM and performance of the system SYS may also be improved.

Figure 12:
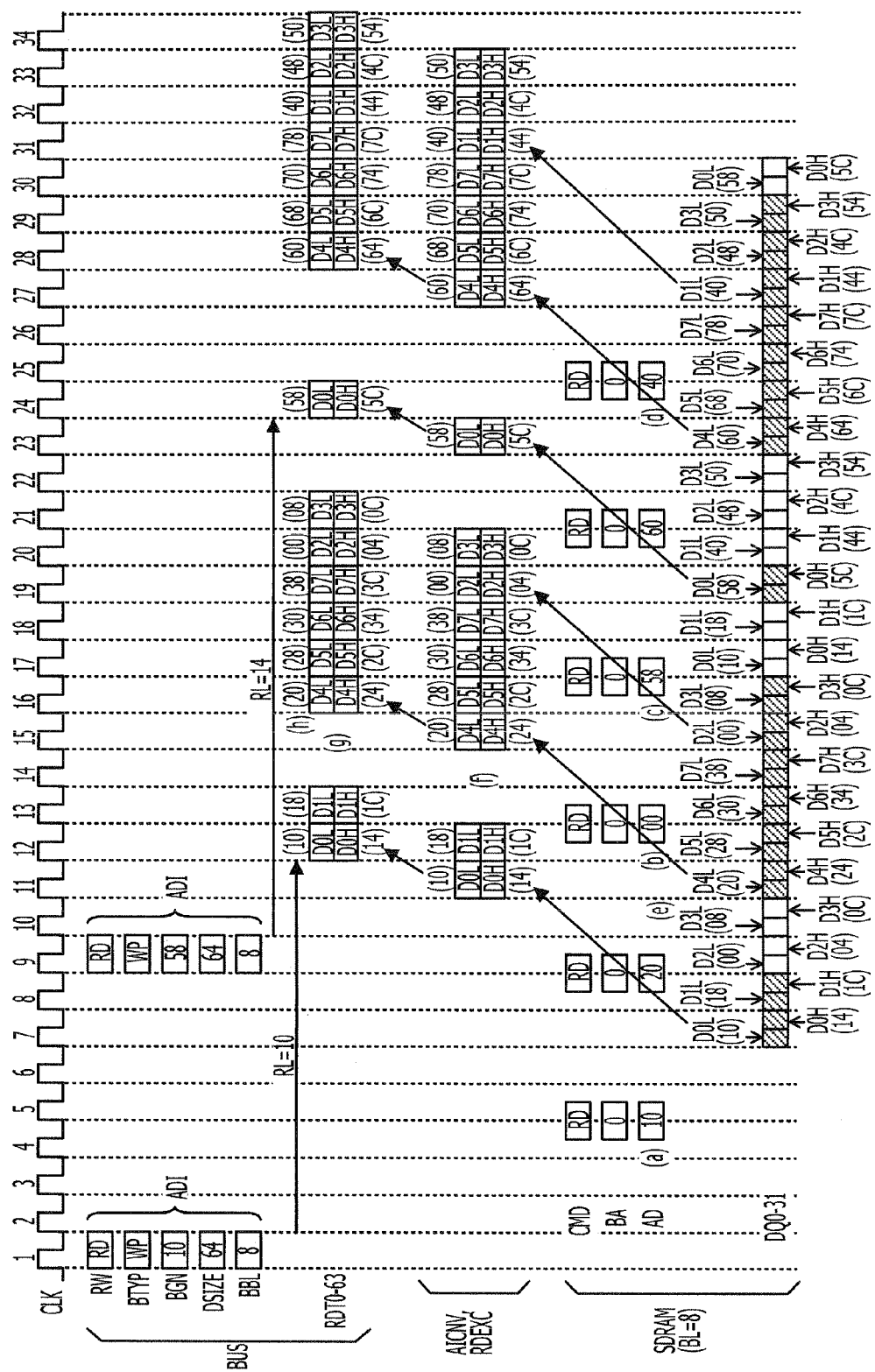
FIG. 12 illustrates an exemplary read access to an SDRAM.

FIG. 12 is an exemplary access to an SDRAM. The SDRAM illustrated in FIG. 12 may correspond to the SDRAM illustrated in FIG. 1. In FIG. 12, descriptions of operations substantially the same as and similar to the operations illustrated in FIGS. 8 and 11 are omitted or reduced. The SDRAM accessed by the memory controller MCNT may be substantially the same as or similar to the SDRAM illustrated in FIG. 8. Address information ADI supplied from the master controller MST to the memory controller MCNT may be the same as the address information items illustrated in FIG. 11. Access request addresses BGN (10, 58; in hexadecimal notation) supplied from the master controller MST to the bus BUS may be different from the leading addresses of the memory blocks MB. In FIG. 12, for example, the high-speed mode HS may be set to the register REG illustrated in FIG. 1 and a sorting signal EXC may be in an inactive state. Therefore, read data items may not be sorted. The SDRAM may be in an active state such as a page-hit state based on an active command.

When the read data is not sorted, similar to FIG. 9, the first memory block MB is accessed twice in accordance with two addresses AD(10) and AD(00) ((a) and (b) in FIG. 12). The memory block MB is accessed twice in accordance with two addresses AD(58) and AD(40) ((c) and (d) in FIG. 12).

In FIG. 12, read data items DQO to DQ31 denoted by hatching are transmitted to the master controller MST. Read data D2L, D2H, D3L and D3H output from the SDRAM in synchronization with the ninth and tenth clock signals CLK may not be transmitted to the master controller MST at this timing ((e) in FIG. 12). The memory controller MCNT may not receive the read data D2L, D2H, D3L and D3H ((f) in FIG. 12). The memory controller MCNT outputs a busy signal BSY in a period of time when read data is not output to the bus BUS. The master controller MST waits a reception of a next read data while receiving the busy signal BSY ((g) in FIG. 12).

The read-data control circuit RDCNT1 receives next read data D4L and D4H two clock cycles after receiving the read data D1L and D1H ((h) in FIG. 12). When an access request address BGN is included in addresses of the memory block MB, read data are read in an intermittent manner. In the read access illustrated in FIG. 12, read latencies RL of the bus BUS may be "10" and "14". The read latency RL of the first read access illustrated in FIG. 12 may be smaller than the read latency RL of the first read access illustrated in FIG. 11 by "2". In the high-speed mode HS in which the read data is not sorted, the master controller MST immediately receives the first read data item.

For example, the master controller MST may supply a third read access request (transaction) in the 25th clock cycle or after the 25th clock cycle. When the read data is not sorted, the number of read access requests supplied from the master controller MST to the memory controller MCNT may be reduced. Access frequency to the SDRAM may be reduced.

Figure 13:
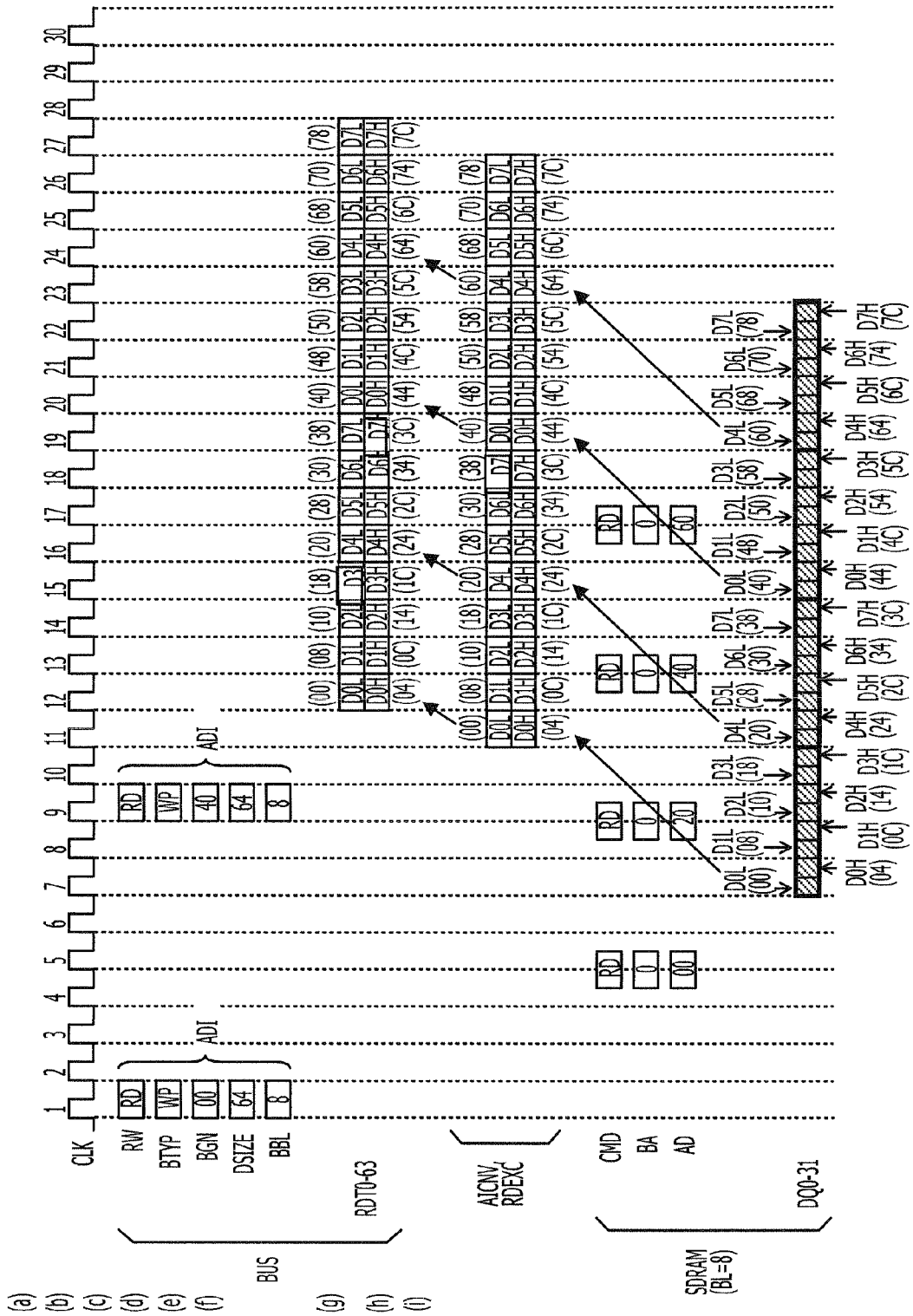
FIG. 13 illustrates an exemplary read access to an SDRAM.

FIG. 13 illustrates an exemplary access to an SDRAM. The SDRAM illustrated in FIG. 13 may correspond to the SDRAM illustrated in FIG. 1. In FIG. 13, descriptions of operations substantially the same as or similar to the operations illustrated in FIGS. 8 and 11 are omitted or reduced. The SDRAM accessed by the memory controller MCNT may be substantially the same as or similar to the SDRAM illustrated in FIG. 8. Address information ADI supplied from the master controller MST to the memory controller MCNT may be substantially the same as or similar to the address information illustrated in FIG. 10. Access request addresses BGN (00, 40; in hexadecimal notation) correspond to the leading addresses of the memory blocks MB. The SDRAM may be in an active state such as a page-hit state based on an active command.

Since the access request addresses BGN(00) and BGN(40) correspond to the leading addresses of the memory blocks MB, in FIG. 13, the sorting determination circuit JDG outputs a sorting signal EXC representing that sorting of read data is not performed, for example, "logic 0". As illustrated in FIG. 13, every time a read address request RD is supplied from the master controller MST, two read commands RD are supplied to the SDRAM and read data is read from the SDRAM. For example, in FIG. 10, when the access request addresses BGN are different from leading addresses of the memory blocks MB, the SDRAM is accessed in a minimum cycle period.

Figure 14:
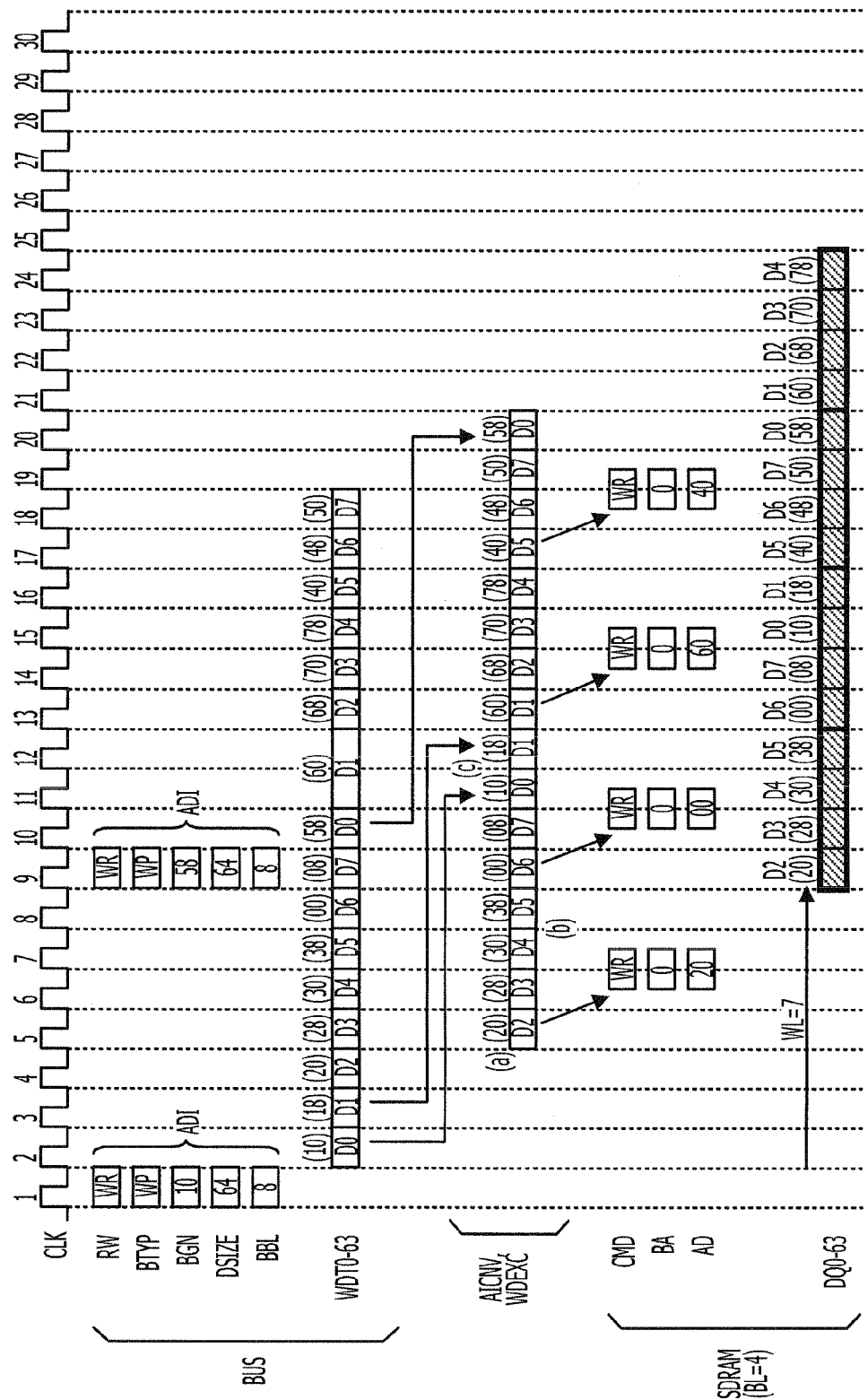
FIG. 14 illustrates an exemplary write access to an SDRAM.

FIG. 14 illustrates an exemplary access to an SDRAM. The SDRAM illustrated in FIG. 14 may correspond to the SDRAM illustrated in FIG. 1. In FIG. 14, descriptions of operations substantially the same as or similar to the operations illustrated in FIG. 8 are omitted or reduced. In FIG. 14, an SDRAM of single-data-rate (SDR) type having 64-bit data terminals DQ0 to DQ63 is accessed. A burst length BL may be set to "4". Address information ADI supplied from the master controller MST to the memory controller MCNT may be substantially the same as or similar to the address information illustrated in FIG. 8. Access request addresses BGN (10, 58; in hexadecimal notation) may be different from the leading addresses of the memory blocks MB. The SDRAM may be in an active state such as a page-hit state based on an active command.

As illustrated in FIG. 14, the address information changing circuit AICNV sets an access starting address AD to a leading address (20) of the memory block MB ((a) in FIG. 14). The write-data sorting circuit WDEXC stores supplied write data D0 and D1 in the write buffer circuit, e.g., FIFO, and sequentially outputs other write data D2 to D7 to the write-data control circuit WDCNT1 ((b) in FIG. 14). A write latency WL may be the same as the write latency WL illustrated in FIG. 8. After outputting the write data D7, the write-data sorting circuit WDEXC sequentially outputs the write data D0 and D1 stored in the write buffer circuit (FIFO) to the write-data control circuit WDCNT1 ((c) in FIG. 14). As illustrated in operation 326 of FIG. 3, the write data is sorted. When the SDR-type SDRAM is accessed, the write data is sorted. Accordingly, efficiency in the use of the data terminals DQ and efficiency in the use of the data lines included in the bus BUS are improved.

Figure 15:
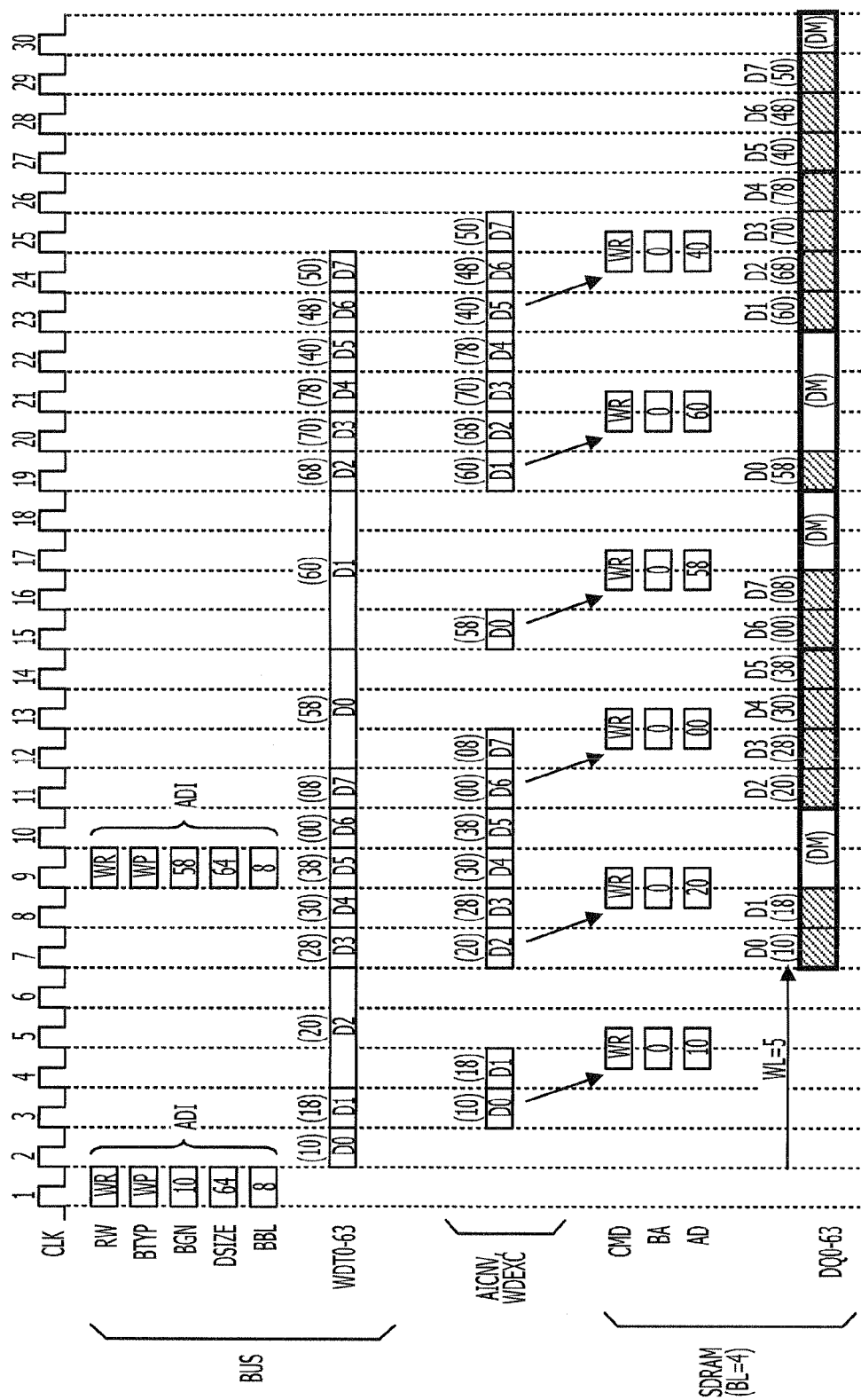
FIG. 15 illustrates an exemplary write access to an SDRAM.

FIG. 15 illustrates an exemplary access to an SDRAM. The SDRAM illustrated in FIG. 15 may correspond to the SDRAM illustrated in FIG. 1. In FIG. 15, descriptions of operations substantially the same as or similar to the operations illustrated in FIGS. 9 and 14 are omitted or reduced. The SDRAM accessed by the memory controller MCNT may be substantially the same as or similar to the SDRAM illustrated in FIG. 14. Address information ADI supplied from the master controller MST to the memory controller MCNT may be substantially the same as or similar to the address information illustrated in FIG. 14. Access request addresses BGN (10, 58; in hexadecimal notation) may be different from the leading addresses of the memory blocks MB. In FIG. 15, the high-speed mode HS is set to the register REG illustrated in FIG. 1, and a sorting signal EXC is in an inactive state. Write data is not sorted. The SDRAM may be in an active state such as a page-hit state based on an active command.

FIG. 15 illustrates a timing chart. A timing operation illustrated in FIG. 15 may be substantially the same as or similar to the timing operation illustrated in FIG. 9. 64-bit write data are written to the SDRAM in synchronization with rising edges of a clock signal CLK. A write latency WL may be substantially the same as the write latency WL illustrated in FIG. 9. When access request addresses BGN correspond to addresses included in the memory blocks MB, data mask periods DM are generated and a frequency of output of a busy signal BSY is increased. Therefore, efficiency in the use of the data terminals DQ included in the SDRAM and the data lines included in the bus BUS may be reduced. Accordingly, access efficiency to the SDRAM and performance of the system SYS may be reduced. Since the write latency WL is small, the first write data may be immediately written to the SDRAM.

Figure 16:
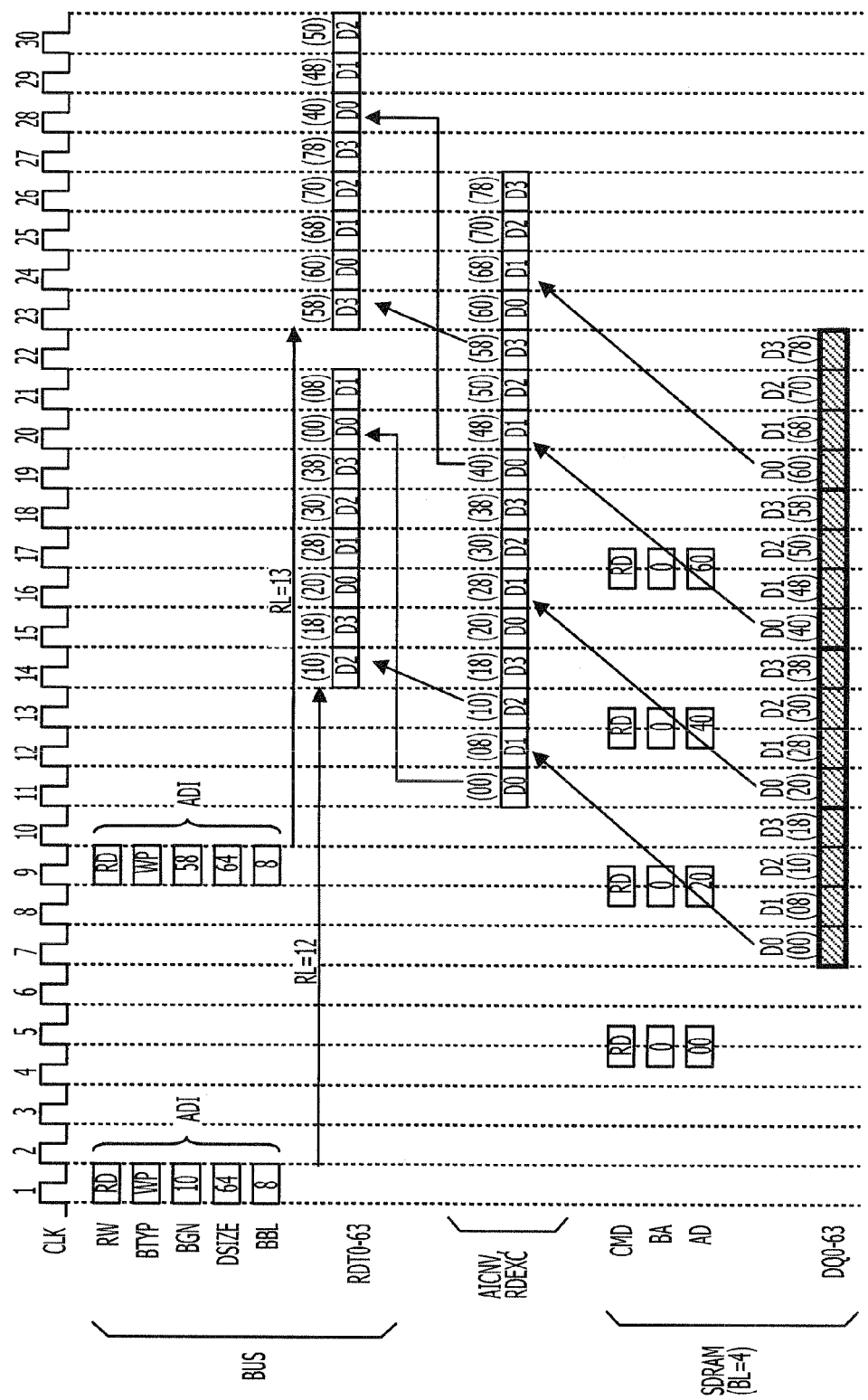
FIG. 16 illustrates an exemplary read access to an SDRAM.

FIG. 16 illustrates an exemplary access to an SDRAM. The SDRAM illustrated in FIG. 16 may correspond to the SDRAM illustrated in FIG. 1. In FIG. 16, descriptions of operations substantially the same as or similar to the operations illustrated in FIGS. 11 and 14 are omitted or reduced. The SDRAM accessed by the memory controller MCNT may be substantially the same as or similar to the SDRAM illustrated in FIG. 14. Address information ADI supplied from the master controller MST to the memory controller MCNT may be substantially the same as or similar to the address information illustrated in FIG. 14. Read/write information RW may correspond to read access requests RD. When first and second access request addresses BGN (10, 58; in hexadecimal notation) correspond to addresses included in the memory blocks MB, read data are sorted. The SDRAM may be in an active state such as a page-hit state based on an active command.

The timing operation illustrated in FIG. 16 may be substantially the same as or similar to the timing operation illustrated in FIG. 11. 64-bit read data is read from the SDRAM in synchronization with rising edges of a clock signal CLK. Read latencies RL of the bus BUS may be substantially the same as the read latencies RL illustrated in FIG. 11. When the SDR-type SDRAM is accessed, the read data is sorted, and efficiency in the use of the data terminals DQ and the data lines of the bus BUS is improved.

Figure 17:
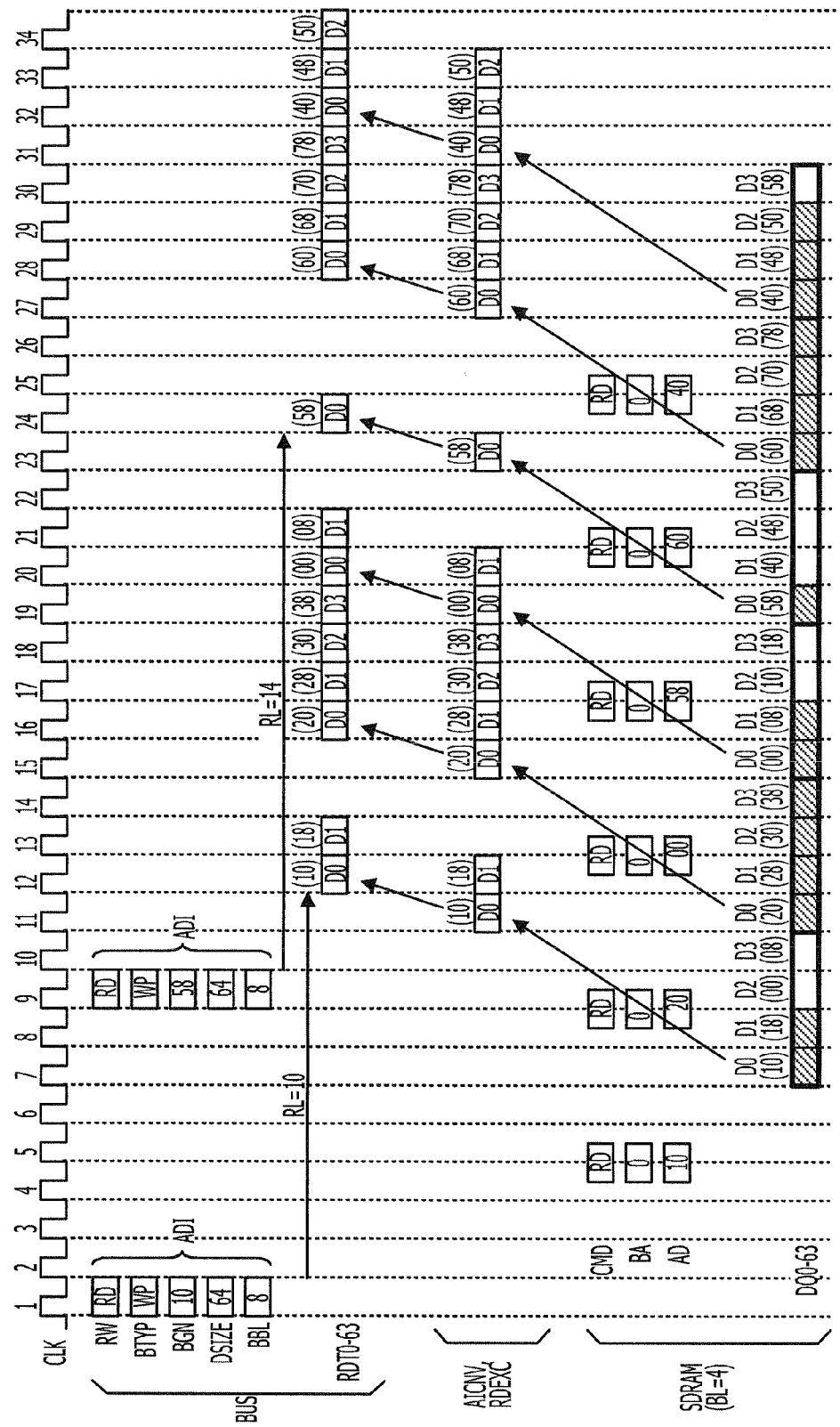
FIG. 17 illustrates an exemplary read access to an SDRAM.

FIG. 17 illustrates an exemplary access to an SDRAM. The SDRAM illustrated in FIG. 17 may correspond to the SDRAM illustrated in FIG. 1. In FIG. 17, descriptions of operations substantially the same as or similar to the operations illustrated in FIGS. 12 and 14 are omitted or reduced. The SDRAM accessed by the memory controller MCNT may be substantially the same as or similar to the SDRAM illustrated in FIG. 14. Address information ADI supplied from the master controller MST to the memory controller MCNT may be substantially the same as or similar to the address information illustrated in FIG. 14. Access request addresses BGN (10, 58; in hexadecimal notation) may be different from the leading addresses of the memory blocks MB. In FIG. 17, the high-speed mode HS is set to the register REG illustrated in FIG. 1, and a sorting signal EXC is in an inactive state. Therefore, write data are not sorted. The SDRAM may be in an active state such as a page-hit state based on an active command.

A timing operation illustrated in FIG. 17 may be substantially the same as or similar to the timing operation illustrated in FIG. 12. 64-bit read data are read from the SDRAM in synchronization with rising edges of a clock signal CLK. Read latencies RL may be substantially the same as the read latencies RL illustrated in FIG. 12. Also in the SDR-type SDRAM, when access request addresses BGN are different from the leading addresses included in the memory blocks MB, a read latency RL of the first read access may be reduced when the high-speed mode HS is set to the memory controller MCNT.

When the access request addresses BGN are different from the leading addresses of the memory blocks MB, the memory blocks MB including the access request addresses BGN are subjected to read access once, and read data corresponding to the access request addresses BGN are output to the bus BUS. When the access request addresses BGN are different from the leading addresses of the memory blocks MB, the memory blocks MB including the access request addresses BGN are subjected to write access once and write data corresponding to the access request addresses BGN are written to the SDRAM. A number of read commands RD and write commands WR to be supplied to the SDRAM is reduced, and access efficiency to a semiconductor memory is improved.

Consequently, a frequency in the use of the data terminals DQ included in the SDRAM in the write access and the read access may be reduced. Efficiency in the use of the data terminals DQ included in the SDRAM may be improved. A frequency in output of a busy signal BSY from the memory controller MCNT to the master controller MST may be reduced. A frequency in the use of the data lines included in the bus BUS in the write access may be reduced. The number of clock cycles in which read data is not output to the data lines included in the bus BUS in the read access may be reduced. Efficiency in the use of the bus BUS, access efficiency to the SDRAM, and performance of the system SYS may be improved.

Since data is not sorted when the high-speed mode HS is set, the SDRAM is accessed based on a read latency RL or a write latency WL.

Figure 18:
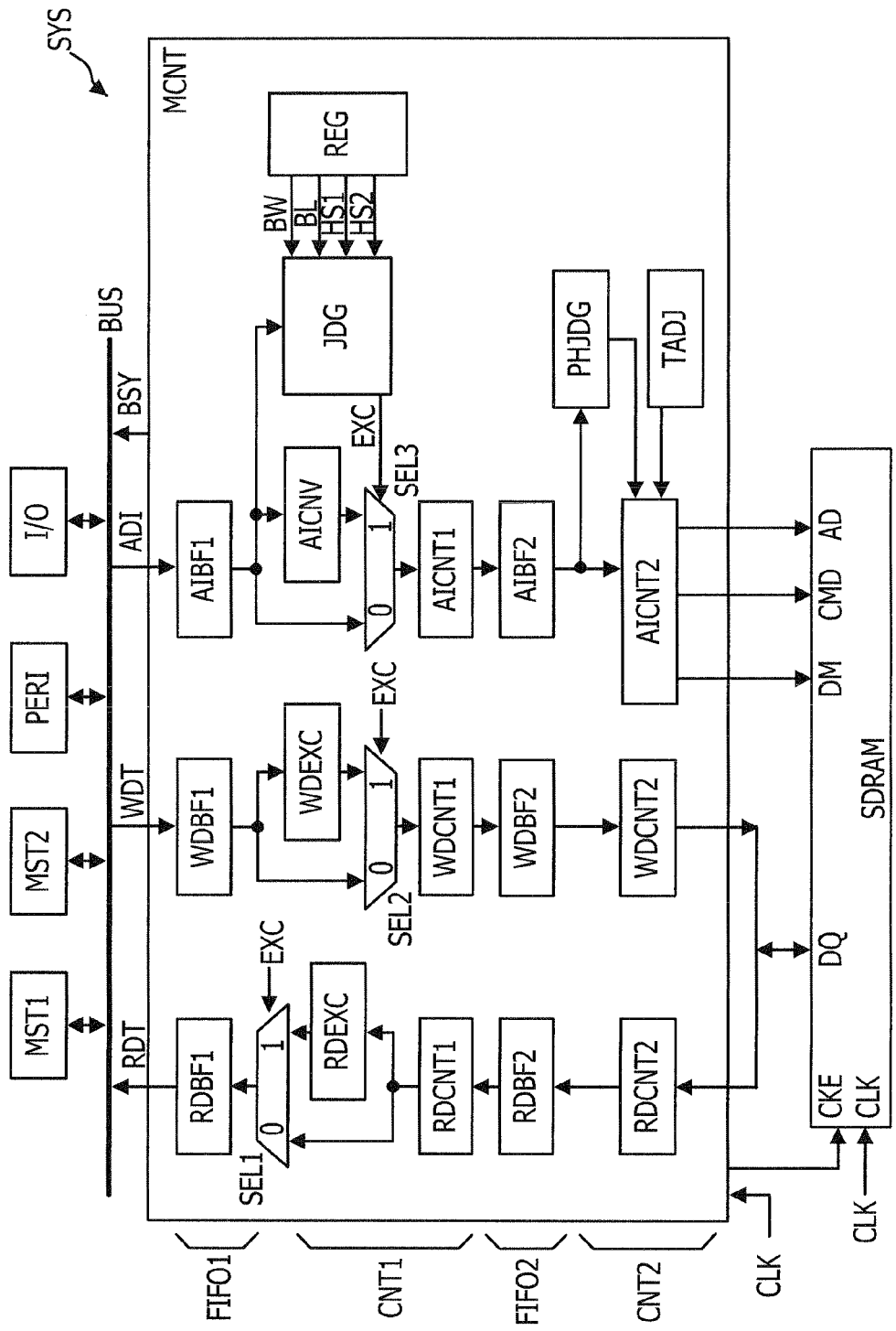
FIG. 18 illustrates an exemplary system.

FIG. 18 illustrates an exemplary system. In FIG. 18, descriptions of elements substantially the same as or similar to the elements illustrated in FIG. 1 are omitted or reduced. A semiconductor memory may be an SDRAM or another semiconductor memory having a wrapping burst transmission function such as an SRAM or a ferroelectric memory.

A system SYS includes two master controllers MST1 and MST2 which are coupled to a bus BUS. Address information ADI supplied to a memory controller MCNT through the bus BUS may include information representing the master controllers MST1 and MST2 which issue an access request (transaction). The memory controller MCNT includes a register REG which stores high-speed modes HS1 and HS2 for the respective master controllers MST1 and MST2. When the address information ADI includes an ID of the master controller MST1, a sorting determination circuit JDG outputs a sorting signal EXC in accordance with the high-speed mode HS1. When the address information ADI includes an ID of the master controller MST2, the sorting determination circuit JDG outputs a sorting signal EXC in accordance with the high-speed mode HS2. Other configurations of the system SYS illustrated in FIG. 18 may be substantially the same as or similar to the configurations of the system SYS illustrated in FIG. 1.

The information on the high-speed modes HS1 and HS2 may be supplied from the bus BUS to the sorting determination circuit JDG. The sorting determination circuit JDG may identify the high-speed modes HS1 and HS2 in accordance with an accessed memory area. When data is immediately read, the sorting signal EXC for sorting is deactivated.

Also in FIG. 18, effects are obtained substantially the same as or similar to those of the forgoing illustrations. When the system SYS has the plurality of master controllers MST1 and MST2, the master controllers MST1 and MST2 determines the high-speed modes HS1 and HS2, respectively, and the SDRAM is accessed.

Figure 19:
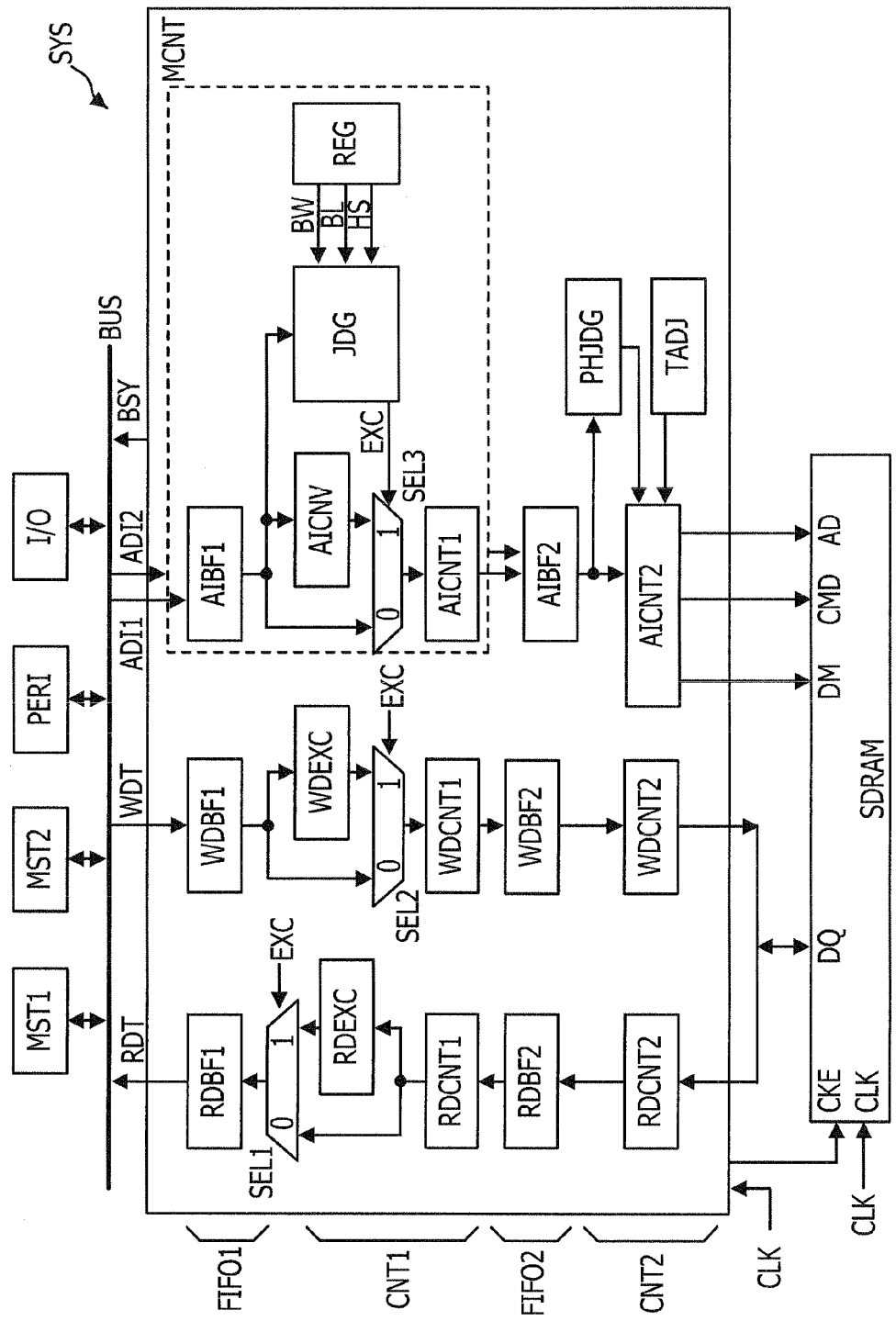
FIG. 19 illustrates an exemplary system.

FIG. 19 illustrates an exemplary system. In FIG. 19, descriptions of elements substantially the same as or similar to the elements illustrated in FIG. 1 are omitted or reduced. A semiconductor memory may be an SDRAM or another semiconductor memory having a wrapping burst transmission function such as an SRAM or a ferroelectric memory.

A system SYS includes two master controllers MST1 and MST2 which are coupled to a bus BUS. The master controllers MST1 and MST2 output address information ADI1 and address information ADI2, respectively, to independent ports of a memory controller MCNT. In FIG. 19, the memory controller MCNT includes an address information buffer AIBF1, an address information changing circuit AICNV, an address selector SEL3, an address information control circuit AICNT1, a sorting determination circuit JDG, and a register REG for each of the master controllers MST1 and MST2. A high-speed mode HS is set to each of the master controllers MST1 and MST2.

Information on the high-speed mode HS may be supplied from the bus BUS to the sorting determination circuit JDG together with the address information ADI1 and the address information ADI2. The sorting determination circuit JDG may identify the high-speed mode HS in accordance with an accessed memory area. When data is read, a sorting signal EXC for sorting is deactivated. In FIG. 19, effects are obtained substantially the same as or similar to those of the forgoing illustrations.

The sorting determination circuit JDG determines whether data sorting is to be performed in accordance with the information on the high-speed mode HS. For example, the sorting determination circuit JDG may determine whether data sorting is to be performed and whether address changing is to be performed in accordance with a bus width BW and a burst length BL, which are supplied from the register REG, and the address information ADI without receiving the information on the high-speed mode HS.

In FIG. 18, determinations as to whether data sorting is to be performed and whether address changing is to be performed are made for each of the plurality of master controllers MST1 and MST2 in accordance with the information on the plurality of high-speed modes HS1 and HS2. In FIG. 19, the determinations as to whether data sorting is to be performed and whether address changing is to be performed are made for each of the plurality of master controllers MST1 and MST2 in accordance with address information ADI1 and ADI2. For example, access patterns of the master controllers MST1 and MST2 are detected and the determinations as to whether data sorting is to be performed and whether address changing is to be performed may be made based on result of the detection. When a area to be accessed by the master controller MST1 is different from a area to be accessed by the master controller MST2, the determinations as to whether data sorting is to be performed and whether address changing is to be performed may be made in accordance with an access address such as an access request address BGN, for example.

Example embodiments of the present invention have now been described in accordance with the above advantages. It will be appreciated that these examples are merely illustrative of the invention. Many variations and modifications will be apparent to those skilled in the art.

The invention claimed is:

1. A memory controller comprising:
    a sorting determination circuit which activates a sorting signal when an access request address for wrapping access to at least one memory block of a semiconductor memory is different from a first leading address of the at least one memory block;
    an address conversion circuit which sets the first leading address to an access starting address when the sorting signal is activated;
    a first data sorting circuit which sorts data, when the sorting signal is activated, data sequentially read from the semiconductor memory in accordance with the access starting address starting from data corresponding to the access request address; and
    a first output circuit which outputs the sorted data to an external bus.

2. The memory controller according to claim 1, wherein the sorting determination circuit deactivates the sorting signal in a first mode.

3. The memory controller according to claim 1, further comprising a first selector which selects data supplied from the first data sorting circuit when the sorting signal is activated and selects data supplied from the semiconductor memory when the sorting signal is deactivated.

4. The memory controller according to claim 1, wherein, when a plurality of memory blocks are accessed and the access request address is different form the first leading address, the address conversion circuit sets a second leading address of a memory block including the access request address to the access starting address.

5. The memory controller according to claim 1, wherein the first data sorting circuit includes a first buffer circuit which stores data supplied from the semiconductor memory, and a first sorting selector which selectively outputs at least one of the data supplied from the semiconductor memory and the data stored in the first buffer circuit.

6. The memory controller according to claim 5, wherein the first buffer circuit stores data corresponding to addresses in a range from a second leading address of a memory block including the access request address to an address before the access request address, and the first sorting selector selects the data stored in the first buffer circuit after selecting data corresponding to addresses in a range from the access request address to an address before the second leading address.

7. The memory controller according to claim 1, further comprising:
    a second sorting circuit which sorts data, when the sorting signal is activated, data supplied from an external bus in accordance with the access request address starting from data corresponding to the access starting address; and a second output circuit which outputs the sorted data to the semiconductor memory.

8. The memory controller according to claim 7, wherein the sorting determination circuit deactivates the sorting signal in a second mode.

9. The memory controller according to claim 7, further comprising: a second selector which selects data supplied from the second data sorting circuit when the sorting signal is activated and selects the data supplied from the external bus when the sorting signal is deactivated.

10. The memory controller according to claim 7, wherein, when a plurality of memory blocks are accessed, the address conversion circuit sets a third leading address of a next memory block after a memory block including the access request address to the access starting address if the access request address is different from the first leading address.

11. The memory controller according to claim 7, wherein the second data sorting circuit includes a second buffer circuit capable of storing data supplied from the external bus and a second sorting selector which selectively outputs at least one of the data supplied from the external bus and write data stored in the second buffer circuit.

12. The memory controller according to claim 11, wherein the second buffer circuit stores data corresponding to addresses in a range from the access request address to a last address of the memory block including the access request address, and wherein the second sorting selector selects the data stored in the second buffer circuit after selecting data corresponding to addresses in a range from a third leading address of a next memory block after the memory block including the access request address to an address before the access request address.

13. The memory controller according to claim 1, wherein the sorting determination circuit obtains the first leading address of the at least one memory block based on a bus width of a data terminal of the semiconductor memory and a burst length, and activates the sorting signal when the access request address is different from the first leading address.

14. A system comprising:
a semiconductor memory; and
a memory controller which controls the semiconductor memory, wherein the memory controller includes:
a sorting determination circuit which activates a sorting signal when an access request address for wrapping access to at least one memory block of a semiconductor memory is different from a first leading address of the at least one memory block;
an address conversion circuit which sets the first leading address to an access starting address when the sorting signal is activated;
a first data sorting circuit which sorts data, when the sorting signal is activated, data sequentially read from the semiconductor memory in accordance with the access starting address starting from data corresponding to the access request address; and
a first output circuit which outputs the sorted data to an external bus.

15. The system according to claim 14, further comprising a first selector which selects data supplied from the first data sorting circuit when the sorting signal is activated and selects data supplied from the semiconductor memory when the sorting signal is deactivated.

16. The system according to claim 14, wherein, when a plurality of memory blocks are accessed, the address conversion circuit sets a second leading address of a memory block including the access request address to the access starting address if the access request address is different from the first leading address.

17. A method for accessing a semiconductor memory comprising:
setting a first leading address of at least one memory block of a semiconductor memory to an access starting address when a sorting signal is activated;
sorting, when the sorting signal is activated, data sequentially read from the semiconductor memory in accordance with the access starting address starting from data corresponding to an access request address; and
outputting the sorted data to an external bus.

18. The method for accessing a semiconductor memory according to claim 17, further comprising when a plurality of memory blocks are accessed, setting a second leading address of a memory block to the access starting address, if the access request address is different from the first leading address, wherein the second leading address of the memory block includes the access request address.

19. The method for accessing a semiconductor memory according to claim 17, further comprising:
receiving data;
sorting the received data starting from data corresponding to the access request address; and
outputting the sorted data to the semiconductor memory.

20. The method for accessing a semiconductor memory according to claim 17, further comprising when a plurality of memory blocks are accessed, setting a third leading address of a next memory block after a memory block including the access request address to the access starting address, if the access request address is different from the first leading address.

* * * * *